US012755416B2

(12) United States Patent
Ikeda et al.

(10) Patent No.: US 12,755,416 B2
(45) Date of Patent: Oct. 6, 2026

(54) LOCALIZATION APPARATUS AND METHOD

(71) Applicant: Hitachi High-Tech Corporation, Tokyo (JP)

(72) Inventors: Mitsuji Ikeda, Tokyo (JP); Yasutaka Toyoda, Tokyo (JP); Yuichi Abe, Tokyo (JP); Makoto Sato, Tokyo (JP); Haruhiko Higuchi, Tokyo (JP); Masayoshi Ishikawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 354 days.

(21) Appl. No.: 18/282,004

(22) PCT Filed: Mar. 25, 2021

(86) PCT No.: PCT/JP2021/012616

§ 371 (c)(1),
(2) Date: Sep. 14, 2023

(87) PCT Pub. No.: WO2022/201447

PCT Pub. Date: Sep. 29, 2022

(65) Prior Publication Data

US 2024/0177333 A1 May 30, 2024

(51) Int. Cl.
*G06T 7/70* (2017.01)

(52) U.S. Cl.
CPC ...... *G06T 7/70* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

2017/0140245 A1* 5/2017 Kraft .................... G06F 18/214
2020/0167902 A1 5/2020 Li
(Continued)

FOREIGN PATENT DOCUMENTS

JP 2018-536236 A 12/2018
TW 202020805 A 6/2020

OTHER PUBLICATIONS

Tompson et al ("Efficient object localization using convolutional networks." Proceedings of the IEEE conference on computer vision and pattern recognition. 2015, pp. 648-656) (Year: 2015).*
(Continued)

*Primary Examiner* — Leon Viet Q Nguyen
(74) *Attorney, Agent, or Firm* — Crowell & Moring LLP

(57) ABSTRACT

In order to facilitate generation of teacher data and to detect position coordinates with high reliability, there is provided a localization apparatus including: a deep learning model trained by using training image data in which position coordinates desired to be detected are specified and teacher image data in which a pixel group representing a shape independent of a subject of the training image data is arranged at a position relative to the position coordinates desired to be detected; a position coordinate calculation unit calculating position coordinates by using inference image data output from the deep learning model, and a reliability calculation unit calculating reliability by using global information of the pixel group of the inference image data output from the deep learning model.

18 Claims, 19 Drawing Sheets

(56) References Cited

U.S. PATENT DOCUMENTS

| | | | | |
|---|---|---|---|---|
| 2021/0225001 | A1* | 7/2021 | Kubota | G06V 10/22 |
| 2022/0108468 | A1* | 4/2022 | Nakamura | G06T 7/73 |
| 2022/0191542 | A1* | 6/2022 | Ahmadyan | H04N 19/105 |

OTHER PUBLICATIONS

Papandreou et al ("Towards accurate multi-person pose estimation in the wild." Proceedings of the IEEE conference on computer vision and pattern recognition. 2017, pp. 4903-4911) (Year: 2017).*

International Search Report (PCT/ISA/210) issued in PCT Application No. PCT/JP2021/012616 dated Jun. 22, 2021 with English translation (2 pages).

Japanese-language Written Opinion (PCT/ISA/237) issued in PCT Application No. PCT/JP2021/012616 dated Jun. 22, 2021 (3 pages).

Japanese-language International Preliminary Report on Patentability (PCT/IPEA/409 & PCT/IPEA/416) issued in PCT Application No. PCT/JP2021/012616 dated Mar. 7, 2022 (6 pages).

Tompson J et al., "Joint Training of a Convolutional Network and a Graphical Model for Human Pose Estimation", Annual Conference on Neural Information Processing System, 2014, pp. 1-9, (9 pages).

Tompson J et al., "Efficient Object Localization Using Convolutional Networks", Computer Vision and Pattern Recognition, 2015, pp. 1-9, (9 pages).

Law H et al., "CornerNet: Detecting Objects as Paired Keypoints", European Conference on Computer Vision, 2018, pp. 1-14, (14 pages).

Zhou X et al., "Objects as Points", 2019, pp. 1-12, Retrieved from https://arxiv.org/pdf/1904.07860.pdf (12 pages).

Chinese-language Office Action issued in Taiwanese Application No. 110136482 dated Aug. 30, 2022 with partial English translation (9 pages).

* cited by examiner

[FIG. 1]
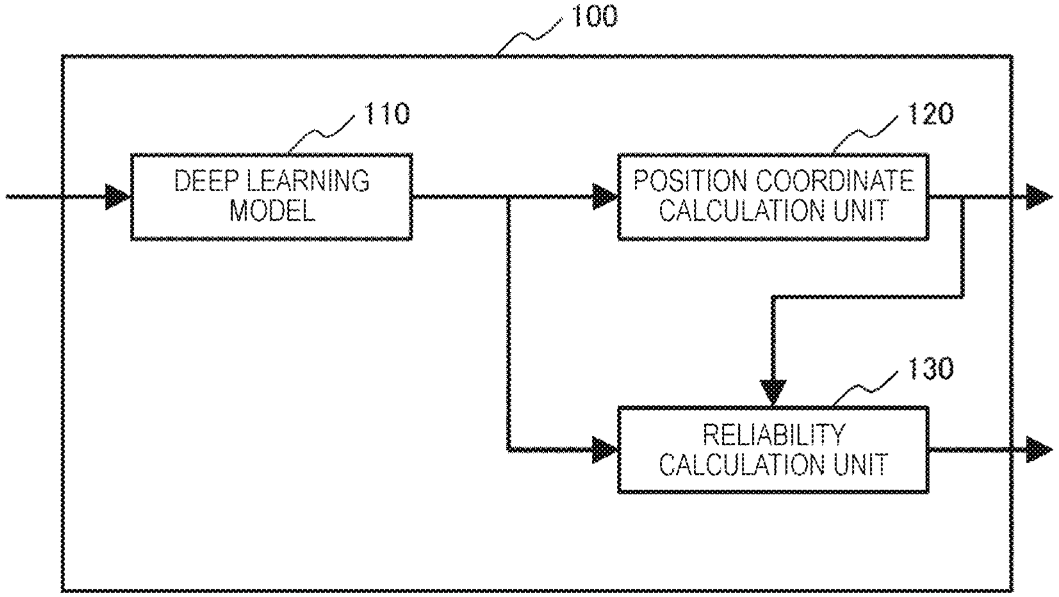

[FIG. 5]
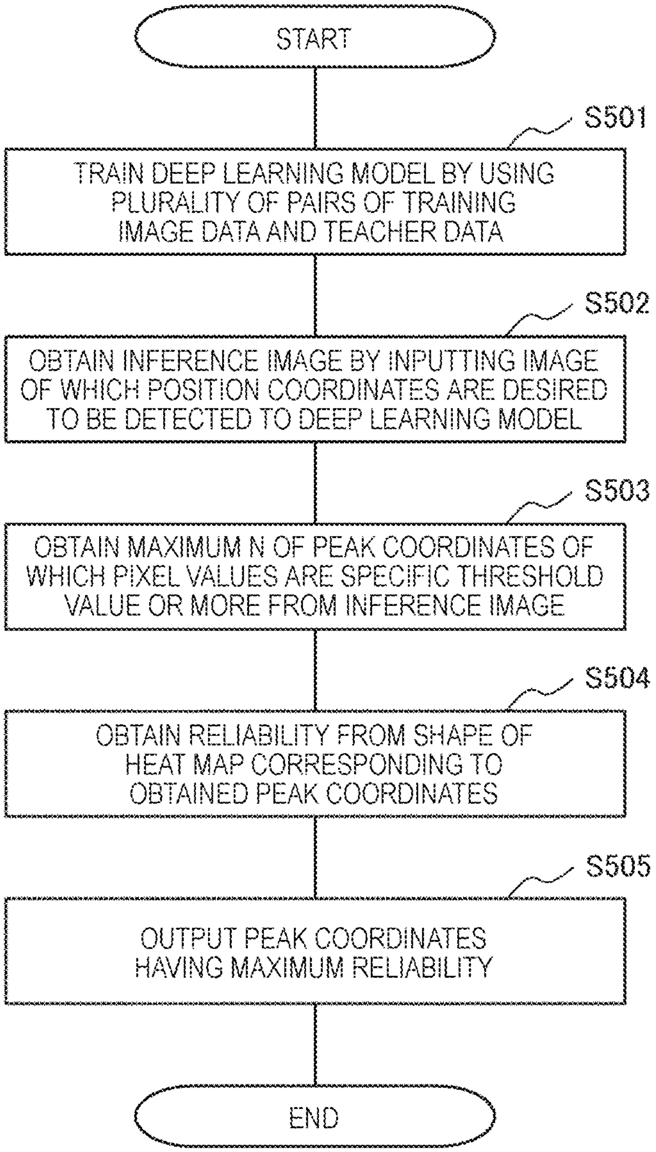

[FIG. 6]
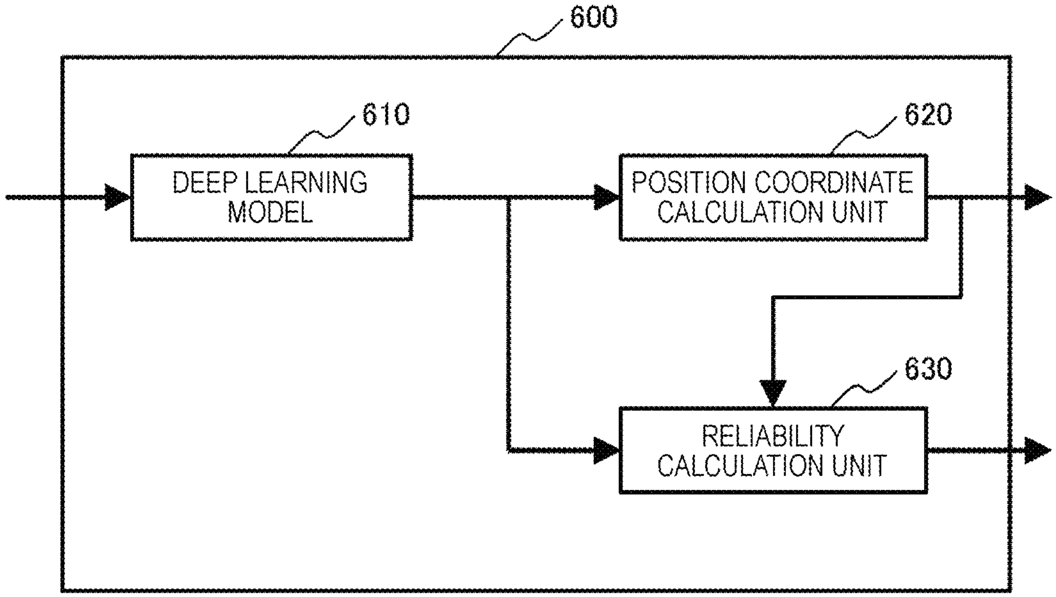

[FIG. 10]
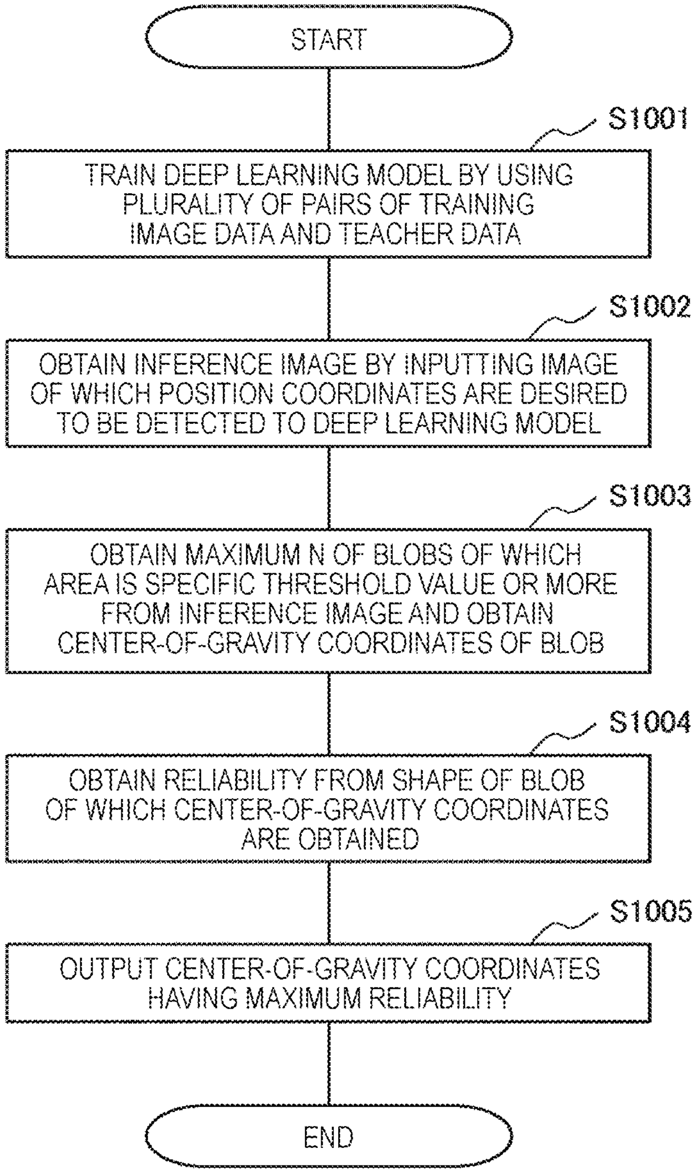

[FIG. 11]
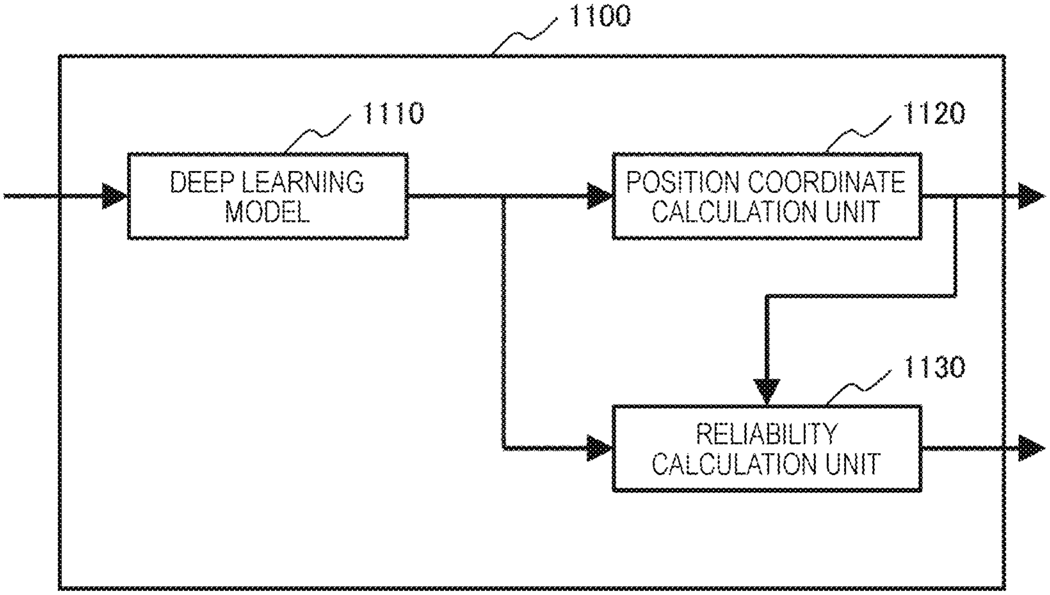

[FIG. 13]
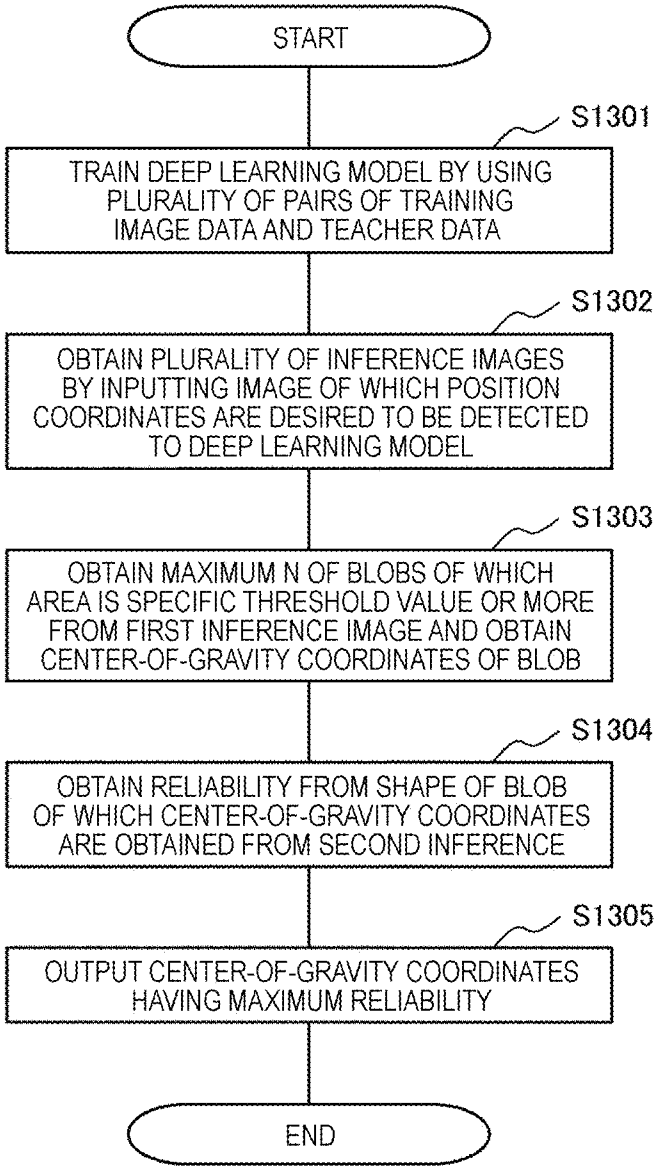

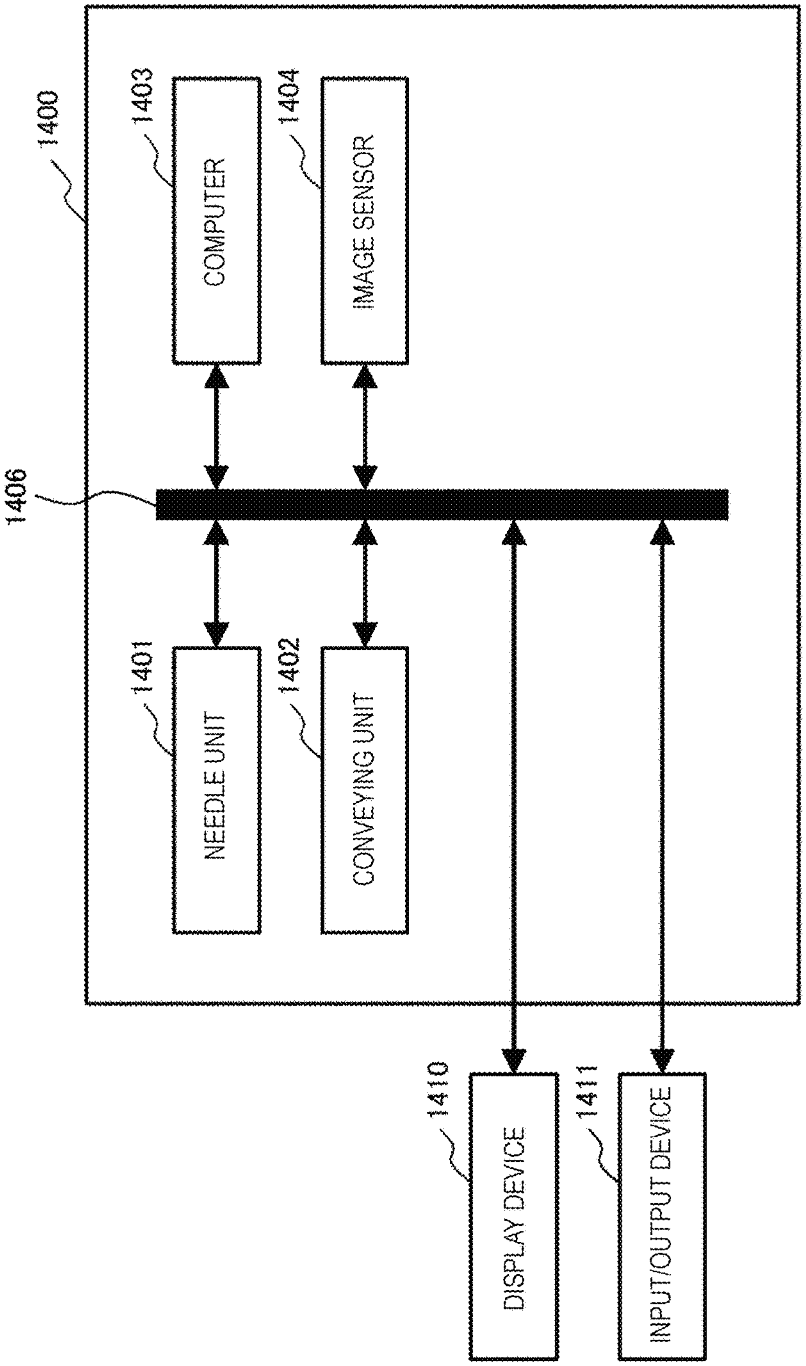
[FIG. 14]

[FIG. 15]
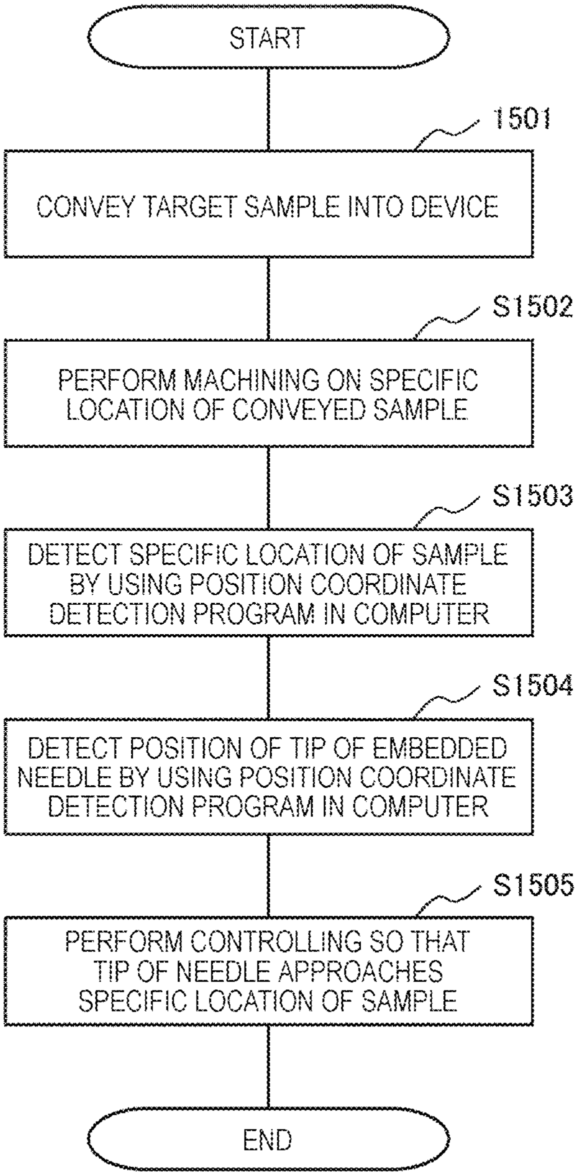

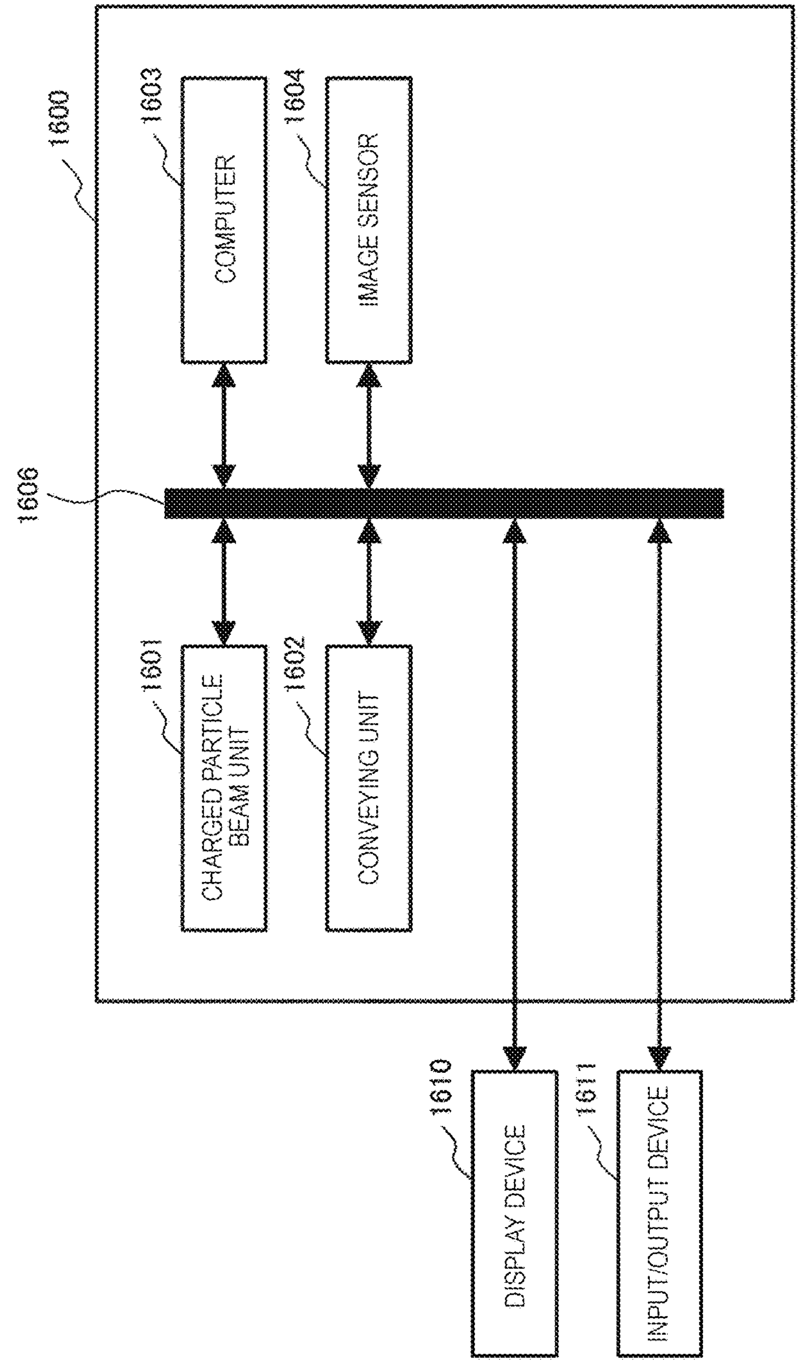
[FIG. 16]

[FIG. 17]
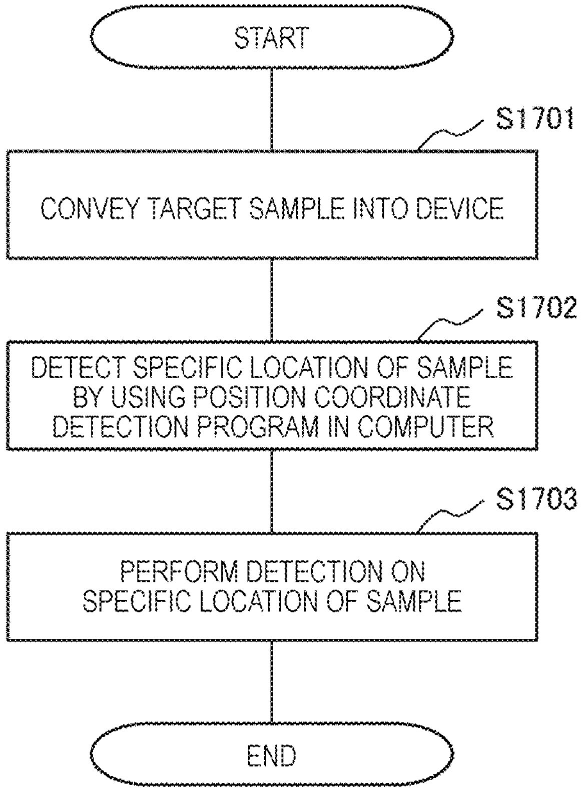
[FIG. 18]
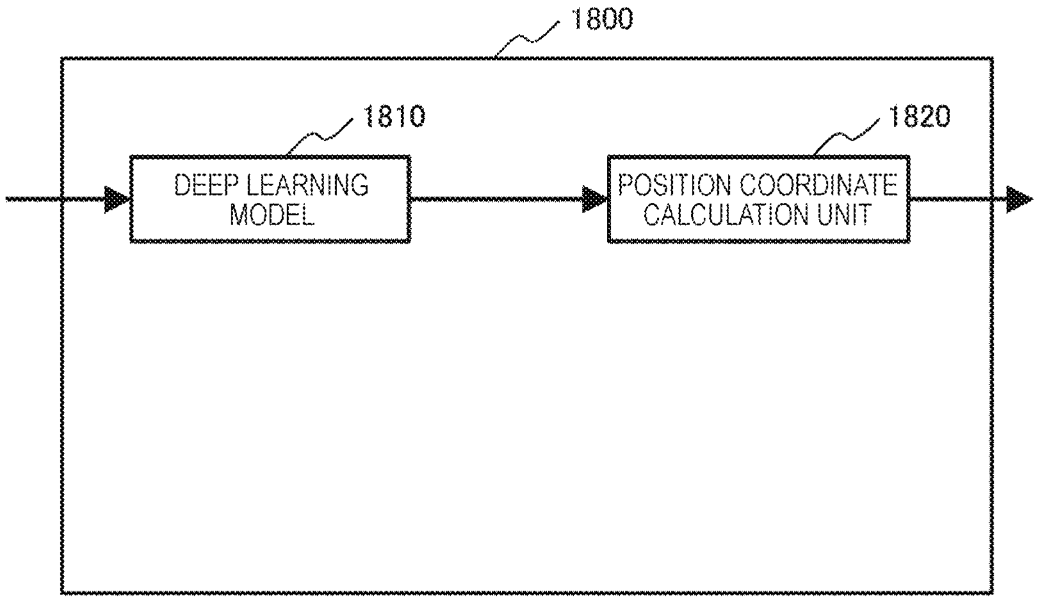

[FIG. 20]
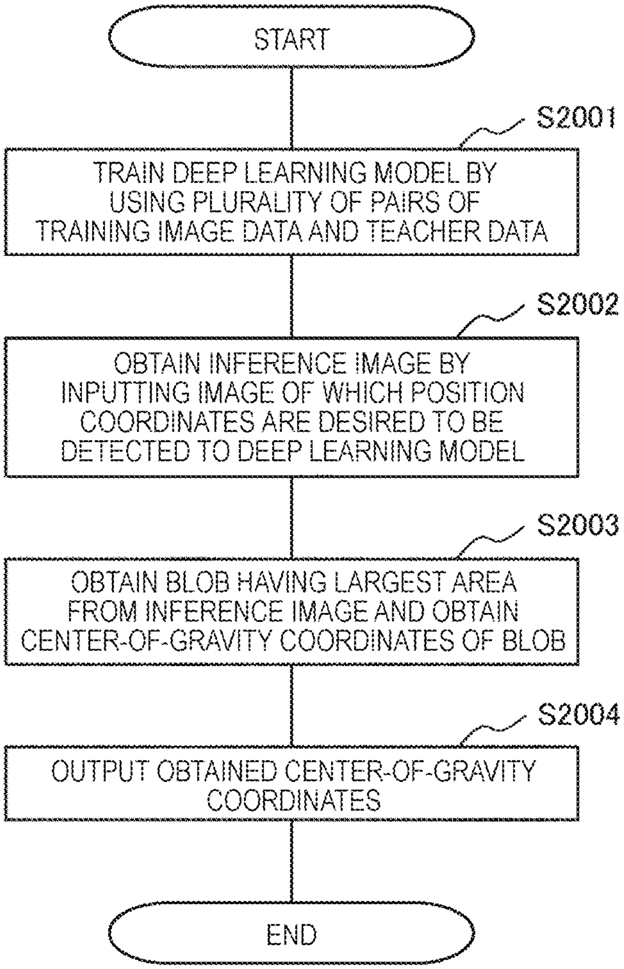

LOCALIZATION APPARATUS AND METHOD

TECHNICAL FIELD

The present invention relates to a localization apparatus and method by using a machine learning technique.

BACKGROUND ART

In recent years, machine learning techniques called deep learning have been used for an image recognition process. Among the machine learning techniques, methods described in Non-PTL 1, Non-PTL 2, Non-PTL 3, and Non-PTL 4 are available as methods for detecting specific position coordinates of an object imaged in an image.

In the related art above described, it is described that, after training a deep learning network by using training image data in which position coordinates desired to be detected are specified and a two-dimensional Gaussian heatmap centered on the position coordinates desired to be detected as teacher data (correct data), a new image is inferred by using a trained deep learning network (called a trained learning model), and the position coordinates desired to be detected in the new image are detected. Since an inference result output by the trained learning model is the two-dimensional Gaussian heatmap, the coordinates of the peak values are output as the position coordinates desired to be detected. In addition, the peak value itself represents reliability (certainty) of the inferred position coordinates.

In the related art described above, when the position coordinates desired to be detected are specified, since the two-dimensional Gaussian heatmap can be automatically generated, there is an advantage in that the teacher data can be easily generated.

CITATION LIST

Patent Literature

Non-PTL 1: Jonathan Tompson, Arjun Jain, Yann LeCun, Christoph Bregler, "Joint Training of a Convolutional Network and a Graphical Model for Human Pose Estimation", Annual Conference on Neural Information Processing System, 2014.

Non-PTL 2: Jonathan Tompson, Ross Goroshin, Arjun Jain, Yann LeCun, Christoph Bregler, "Efficient Object Localization Using Convolutional Networks", Computer Vision and Pattern Recognition, 2015.

Non-PTL 3: Hei Law, Jia Deng, "CornerNet: Detecting Objects as Paired Keypoints", European Conference on Computer Vision, 2018.

Non-PTL 4: Xingyi Zhou, Dequan Wang, Philipp Krähenbühl, "Objects as Points", Internet <https://arxiv.org/pdf/1904.07850.pdf>, 2019.

SUMMARY OF INVENTION

Technical Problem

When position coordinates are used to automate apparatus operations, such as industrial products, it is required to automatically determine whether the position coordinates inferred by a trained learning model are correct. At this time, it is conceivable to use reliability.

However, in the related art, since an inferred peak value of a heatmap indicates the position coordinates desired to be detected and the reliability at the same time, when the peak value is erroneous, there is a possibility that a problem of continuing an operation while determining the incorrect position coordinate or the incorrect reliability as a correct position coordinate or correct reliability.

It is necessary to use the scale different from the inferred peak value of the heatmap as the reliability, or to calculate the position coordinates and the reliability by using the different scale.

An object of the invention is to solve the above-described problems of the related art and to provide a localization apparatus and method capable of implementing position detection with high detection performance only by providing an image and coordinates desired to be detected.

Solution to Problem

In order to solve the above-described problems of the related art, a localization apparatus according to the invention includes: a deep learning model trained by using a plurality of combinations of training image data in which a position desired to be detected on an image obtained by imaging a subject is specified and teacher image data generated by arranging a pixel group different from background of the subject with respect to the subject at the position desired to be detected on the training image data; a position coordinate calculation unit calculating position coordinates by using inference image data obtained by inputting an image of a new subject of which position coordinates are desired to be detected to the deep learning model; and a reliability calculation unit calculating reliability of the position coordinates calculated by the position coordinate calculation unit by using information about the pixel group of the inference image data output from the deep learning model.

Advantageous Effects of Invention

According to the invention, since the reliability can be obtained by using a scale different from the peak value of the heatmap, the possibility that the peak value is incorrect can be determined. Furthermore, when the position coordinates or the reliability are calculated from the shape of the pixel group of the inference data, since the pixel group independent of the shape of the subject is used as the teacher data, the position coordinates or the reliability can be obtained without depending on the shape of the subject.

BRIEF DESCRIPTION OF DRAWINGS

FIG. 1 is a block diagram illustrating a configuration example of a localization apparatus according to a first embodiment.

FIG. 5 is a flowchart illustrating a localization program according to the first embodiment.

FIG. 6 is a block diagram illustrating a configuration example of a localization apparatus according to a second embodiment.

FIG. 10 is a flowchart illustrating a localization program according to the second embodiment.

FIG. 11 is a block diagram illustrating a configuration example of a localization apparatus according to a third embodiment.

FIG. 13 is a flowchart illustrating a localization program according to the third embodiment.

FIG. 14 is a block diagram illustrating a configuration example of a sample machining apparatus according to a fourth embodiment.

FIG. 15 is a flowchart illustrating an example of an operation of the sample machining apparatus according to the fourth embodiment of FIG. 14.

FIG. 16 is a block diagram illustrating a configuration example of a sample inspection apparatus according to a fifth embodiment.

FIG. 17 is a flowchart illustrating an example of an operation of the sample inspection apparatus according to the fifth embodiment of FIG. 16.

FIG. 18 is a block diagram illustrating a configuration example of a localization apparatus according to a modified example of the second embodiment.

FIG. 20 is a flowchart illustrating a localization program according to the modified example of the second embodiment.

DESCRIPTION OF EMBODIMENTS

The invention relates to a localization apparatus including: a deep learning model trained by using training image data in which position coordinates desired to be detected are specified and teacher image data in which a pixel group representing a shape independent of a subject of the training image data is arranged at a position relative to the position coordinates desired to be detected; a position coordinate calculation unit calculating position coordinates by using inference image data output from the deep learning model, and a reliability calculation unit calculating reliability by using global information of the pixel group of the inference image data output from the deep learning model.

Hereinafter, embodiments of the invention will be described in detail with reference to the drawings. It is noted that the embodiments described below do not limit the invention according to the claims, and all of the elements described in the embodiments and combinations of the elements are not necessarily essential to solution of the invention. In addition, the embodiments disclosed in the present application also include forms in which various elements described in the embodiments are appropriately combined.

First Embodiment

A first embodiment of the invention will be described with reference to FIGS. 1 to 5.

FIG. 1 is a block diagram illustrating a configuration example of a localization apparatus 100 according to the first embodiment. The localization apparatus 100 includes a deep learning model 110, a position coordinate calculation unit 120, and a reliability calculation unit 130. The localization apparatus 100 is configured with hardware or a software program provided in a portion of a computer system (not illustrated).

The deep learning model. 110 is a trained learning model in which a pre-training is executed by using a plurality of pairs of training image data and teacher data. The deep learning model 110 is a fully-convolutional encoder-decoder network as described in Citation List (Non-PTLs 1 to 4). An example of the training image data and the teacher data will be described with reference to FIGS. 2A and 2B.

Figure 2A:
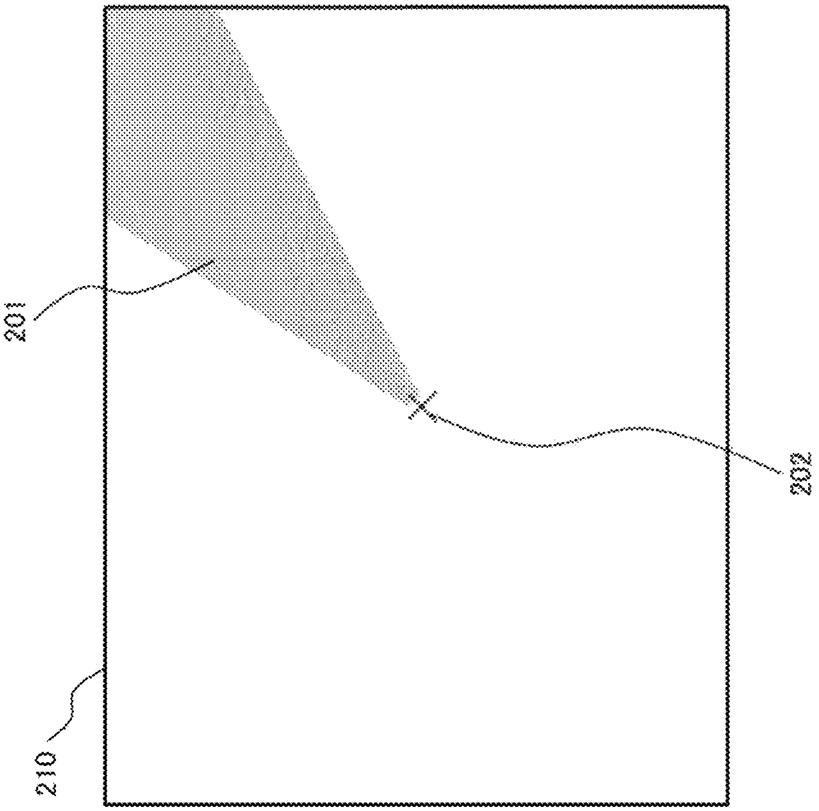
FIGS. 2A and 2B are diagrams illustrating an example of training image data and teacher image data in the first embodiment.

An image 210 in FIG. 2A is training image data (hereinafter, referred to as training image data 210) in which a subject 201 is imaged. The training image data 210 is a figure produced for description and has nothing to do with an image output by an actual apparatus. An x mark 202 on the training image data 210 represents position coordinates desired to be detected. The x mark 202 does not exist on an actual image.

Figure 2B:
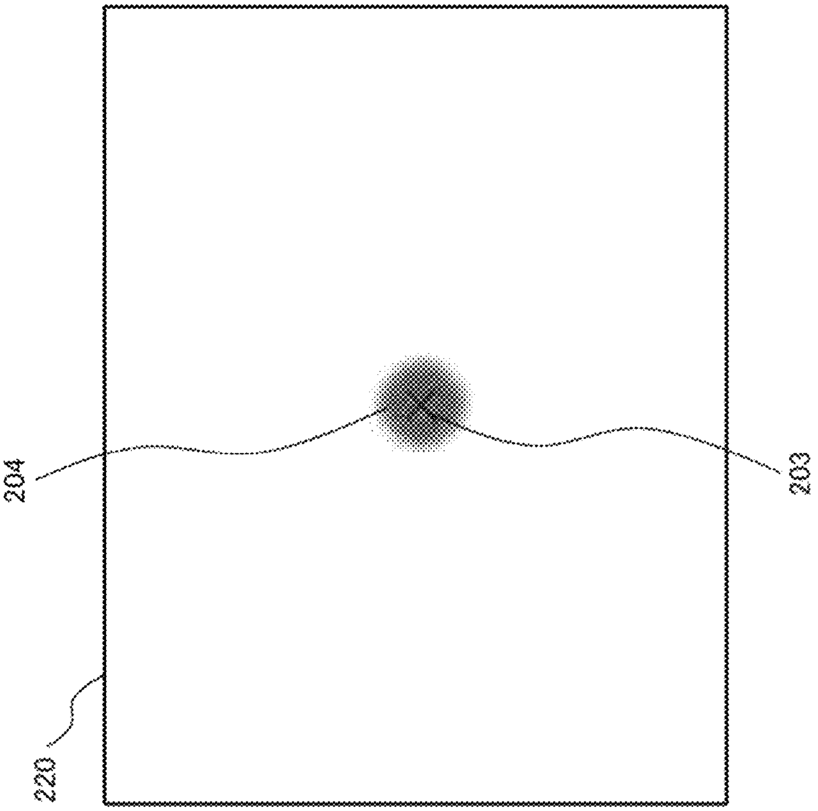

An image 220 in FIG. 2B is teacher data (hereinafter, referred to as teacher data 220) in which a heatmap 204 is formed to be centered on position coordinates of an x mark 203 desired to be detected. The position coordinates of the x mark 203 in the teacher data 220 are the same as the position coordinates of the x mark 202 in the training image data 210. The x mark 203 also does not exist on the teacher data 220. The heatmap 204 is configured with a pixel group representing a high pixel value (for example, 255) at a center and pixel values decreasing as pixels move away from the center. A distribution of pixel values may be two-dimensional Gaussian or conical.

A plurality of pairs of training image data and teacher data as illustrated in FIGS. 2A and 2B are prepared, and the deep learning model 110 is trained.

Figure 3B:
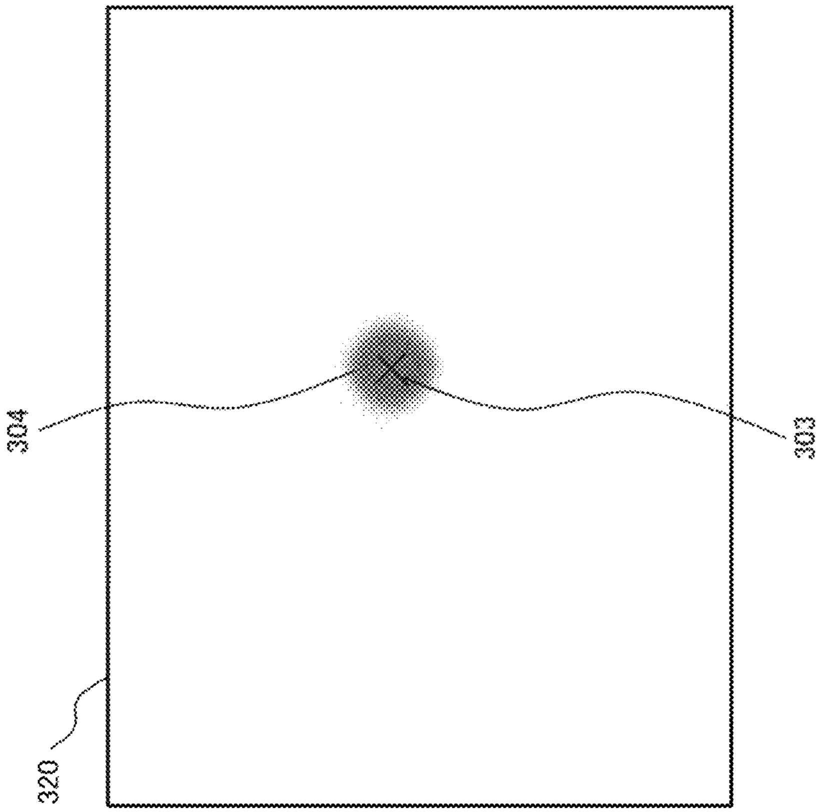
FIGS. 3A and 3B are diagrams illustrating an example of image data of an inference target and inference image data as an inference result in the first embodiment.
Figure 3A:
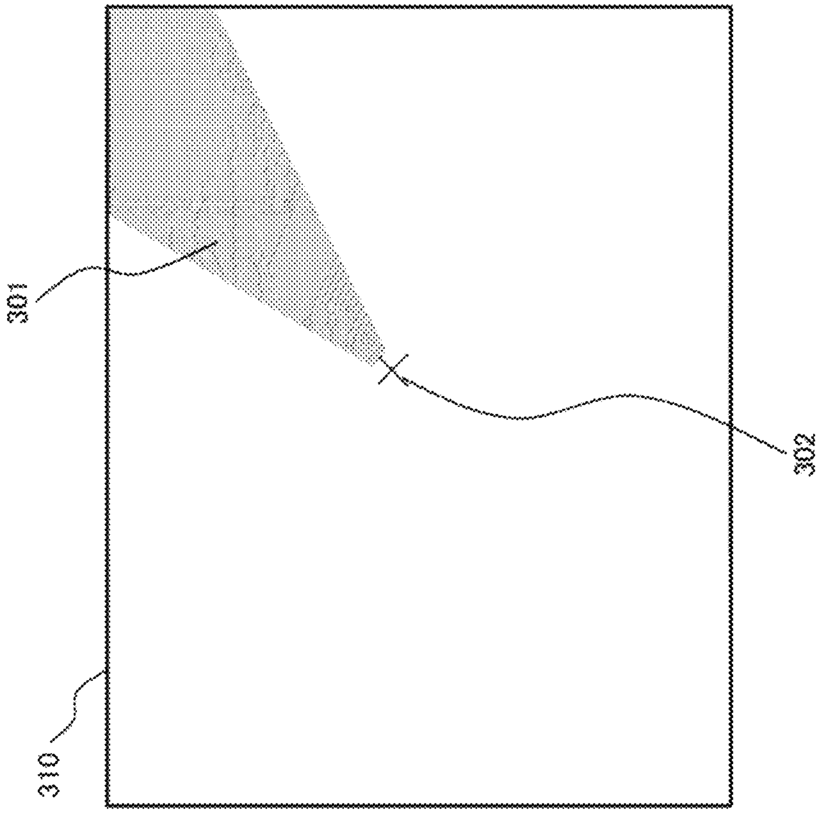

The behavior of the trained deep learning model 110 will be described with reference to FIG. 3. An image 310 in FIG. 3A is an image in which a subject 301 is imaged. The image 310 is a figure produced for description and has nothing to do with the image output by the actual apparatus. An x mark 302 on the image 310 represents the position coordinates desired to be detected. The x mark 302 does not exist on the actual image. An image 320 in FIG. 3B is an inference image (hereinafter, referred to as an inference image 320) in which the heatmap 304 is formed to be centered on position coordinates 303, which are the same as the position coordinates of the x mark 302 desired to be detected in the image 310. In a case where the deep learning model 110 is a trained learning model in which a training is successfully executed, when the image 310 is input to the deep learning model 110, the inference image 320 is output.

The position coordinate calculation unit 120 calculates position coordinates from the inference image 320 inferred by the deep learning model 110. Specifically, by obtaining the peak having a maximum pixel value from the inference image 320, the peak (position coordinate 303) of the heatmap 304 is detected and the coordinate is output.

The reliability calculation unit 130 calculates the reliability from the shape of the heatmap 304 formed at the peak positions output by the position coordinate calculation unit 120 from the inference image 320 inferred by the deep learning model 110. As a specific calculation method, a known technique for quantifying the difference in shape, such as a method of quantifying an isotropy of the heatmap, a method of obtaining a difference from the heatmap used for the teacher data, a method of obtaining a correlation value with the heatmap used for the teacher data, and the like, or a combination technique thereof may be used.

Figure 4B:
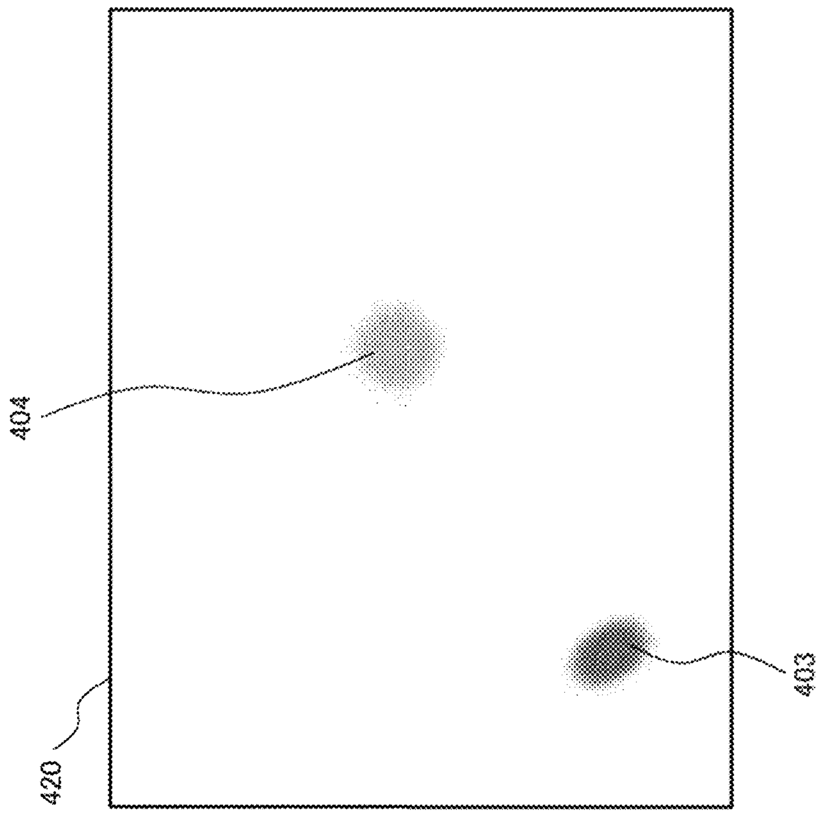
FIGS. 4A and 4B are diagrams illustrating an example of the image data of the inference target and the inference image data as the inference result in the first embodiment.

Next, behavior of the localization apparatus 100 when the difficulty level of detection of the position coordinates is high will be described with reference to FIGS. 4A and 4B.

Figure 4A:
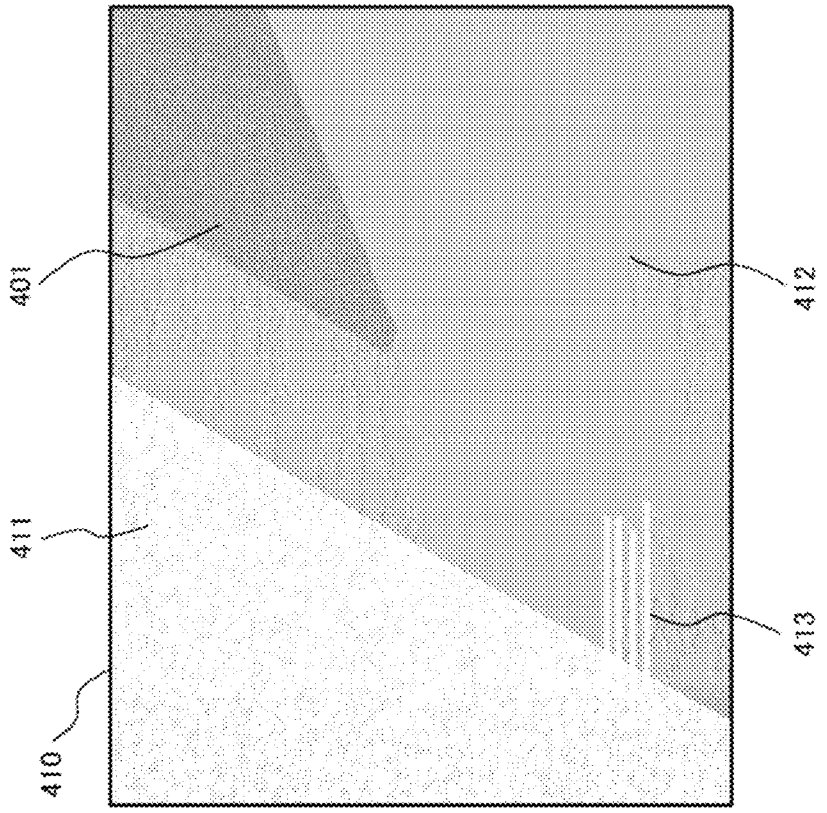

An image 410 in FIG. 4A is an image in which a subject 401 is imaged. The image 410 includes backgrounds 411 and 412 with different contrasts and a noise 413. The image 410 is a figure produced for description and has nothing to do with the image output by the actual apparatus. An image 420 in FIG. 4B illustrates an example of the inference image (hereinafter, referred to as an inference image 420) inferred by applying the image 410 to the deep learning model 110. Two heatmaps of a heatmap 403 and a MAP 404 are formed in the inference image 420. Herein, it is assumed that a peak pixel value of the heatmap 403 is larger than a peak pixel value of the heatmap 404. In addition, it is assumed that the heatmap 403 is less isotropic than the heatmap 404.

The position coordinate calculation unit 120 detects the peak of the heatmap 403 by obtaining the peak having a maximum pixel value from the inference image 420 and outputs the coordinates of the peak.

The reliability calculation unit 130 calculates the reliability from the shape of the heatmap 403 formed at the peak positions output by the position coordinate calculation unit 120 from the inference image 420. Since the heatmap 403 is less isotropic than the heatmap 204 used for the teacher data 220, low reliability is output. Accordingly, it can be seen that the position coordinates output by the position coordinate calculation unit 120 are not appropriate.

In the above-described embodiment, only inappropriate position coordinates are output, but the plurality of position coordinates and the corresponding reliability may be output, and appropriate position coordinates may be selected by a post-stage process (not illustrated). In addition, although the configuration of the localization apparatus 100 is changed, the output of the reliability calculation unit 130 may be input to the position coordinate calculation unit 120 so as to output the position coordinates having the highest reliability.

FIG. 5 is a flowchart of a localization program representing one embodiment of the invention by using a computer system (not illustrated) incorporating the localization apparatus 100 described with reference to FIG. 1.

First, the deep learning model 110 is trained by using the plurality of pairs of the training image data and the teacher data (3501). Examples of the training image data and the teacher data are illustrated in the training image data 210 in FIG. 2A and the teacher data 220 in FIG. 2B, respectively.

Next, the image of which position coordinates are desired to be detected is input to the trained deep learning model to obtain the inference image (S502). The example of the image of which position coordinates are desired to be detected is illustrated as the image 310 in FIG. 3A, and the example of the inference image is illustrated as the inference image 320 in FIG. 3B.

The maximum N of peak coordinates of which pixel values are a specific threshold value or more are obtained from the obtained inference image (S503). The specific threshold value and N are set in advance.

Next, the reliability is calculated from the shape of the heatmap corresponding to the obtained peak coordinates (S504). Examples of the heatmaps are illustrated as 403 and 404 in FIG. 4B. As a specific calculation method, a known technique for quantifying the difference in shape, such as a method of quantifying an isotropy of the heatmap, a method of obtaining a difference from the heatmap used for the teacher data, a method of obtaining a correlation value with the heatmap used for the teacher data, and the like, or a combination technique thereof may be used.

Finally, the peak coordinates having the maximum reliability are obtained, and the peak coordinates are output (S505). At this time, reliability information corresponding to the output peak coordinates may also be output together. An output destination may be a control unit of the computer (not illustrated) (control unit that controls an external apparatus) or a display screen, or may be an external processing apparatus connected to the computer (not illustrated).

According to the present embodiment, since the reliability is calculated by using information different from the peak value of the heatmap, when the peak position is erroneously detected, it can be suggested that the detection is erroneous detection for the output information.

Second Embodiment

A second embodiment of the invention will be described with reference to FIGS. 6 to 10.

FIG. 6 is a block diagram illustrating a configuration example of a localization apparatus 600 according to the second embodiment. The localization apparatus 600 includes a deep learning model 610, a position coordinate calculation unit 620, and a reliability calculation unit 630. The localization apparatus 600 is configured with hardware or a software program provided in a portion of a computer system (not illustrated).

The deep learning model 610 is a trained learning model in which a pre-training is executed by using a plurality of pairs of training image data and teacher data. The deep learning model 610 can perform semantic segmentation. That is, background-likeness and object-likeness for each class are calculated for each pixel, and the label corresponding to the largest calculated value is output as the pixel value. It can be said that each pixel is classified into background or an object. In some cases, as a ratio of a maximum value (or a value of a softmax function) to a total value of background-likeness and object-likeness for each class is greater, likelihood becomes higher. An example of the training image data and the teacher data will be described with reference to FIGS. 7A and 7B.

Figure 7B:
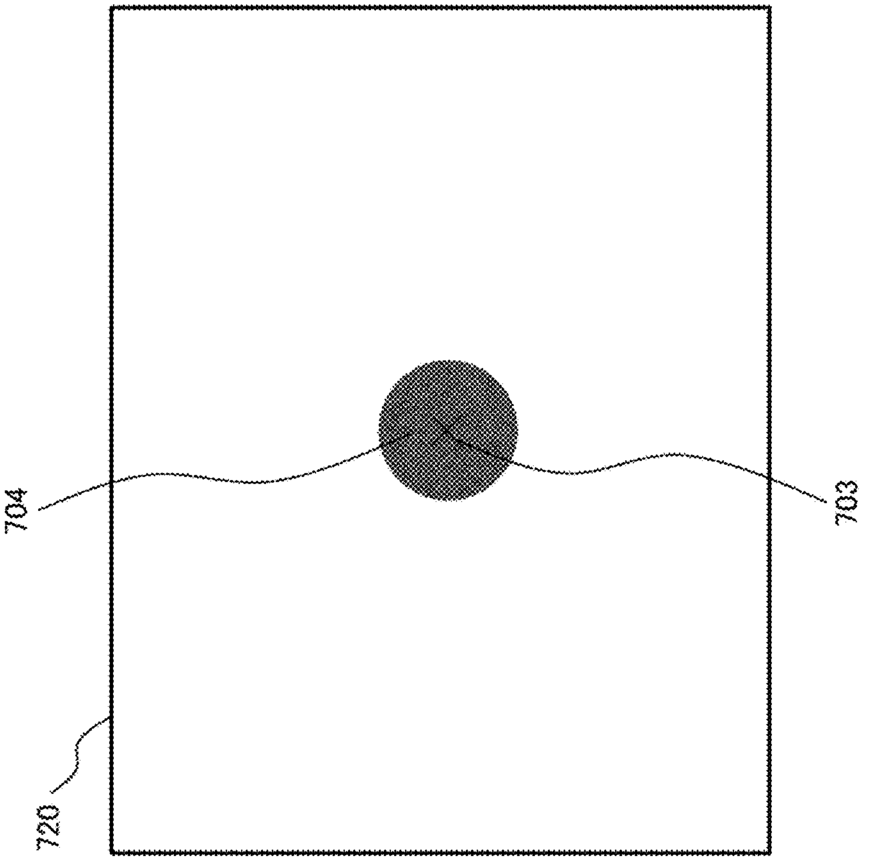
FIGS. 7A and 7B are diagrams illustrating an example of training image data and teacher image data in the second embodiment.
Figure 7A:
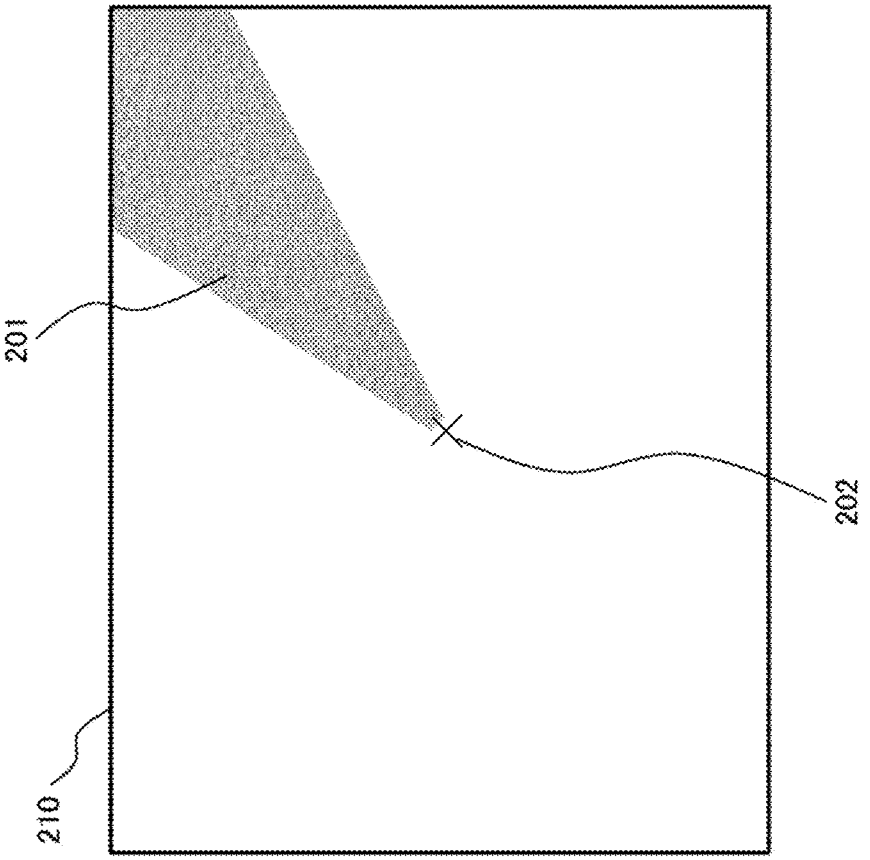

The training image data 210 in FIG. 7A is the same image as the training image data 210 in FIGS. 2A and 2B and is the training image data. An image 720 in FIG. 7B is teacher data (hereinafter, referred to as teacher data 720) in which a circular FIG. 704 is formed to be centered on the position coordinates of an x mark 703 desired to be detected. The x mark 703 in the teacher data 720 has the same coordinates as the x mark 203 in the training image data 210 illustrated in FIGS. 2A and 2B in the first embodiment. Similarly to the x mark 203, the x mark 703 also does not exist on the teacher data 720.

The circular FIG. 704 is configured with the pixel group having the same pixel value (for example, 255). On the other hand, a portion other than the circular figure (called background) has the same value (for example, 0) different from the circular figure. The pixel value of the circular figure corresponds to the label of the position coordinates, and the pixel value of the background corresponds to the label of the background. In this manner, the teacher data 720 in the present embodiment is displayed as a binarized image, which is different from the teacher data 220 in the first embodiment which is displayed as a multivalued image. The pixel group in which pixels such as the circular FIG. 704 are connected is also called the blob in the field of image processing.

The plurality of pairs of the training image data as illustrated in FIG. 7A and the teacher data as illustrated in FIG. 7B are prepared, and the deep learning model 610 is trained.

Figure 8A:
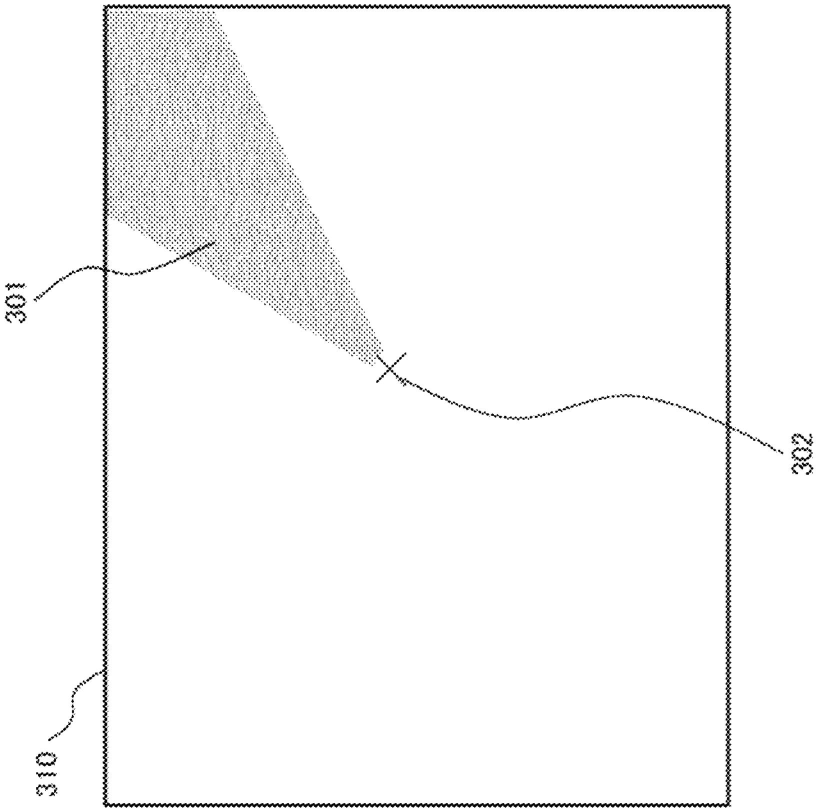
FIGS. 8A and 8B are diagrams illustrating an example of image data of an inference target and inference image data as an inference result in the second embodiment.
Figure 8B:
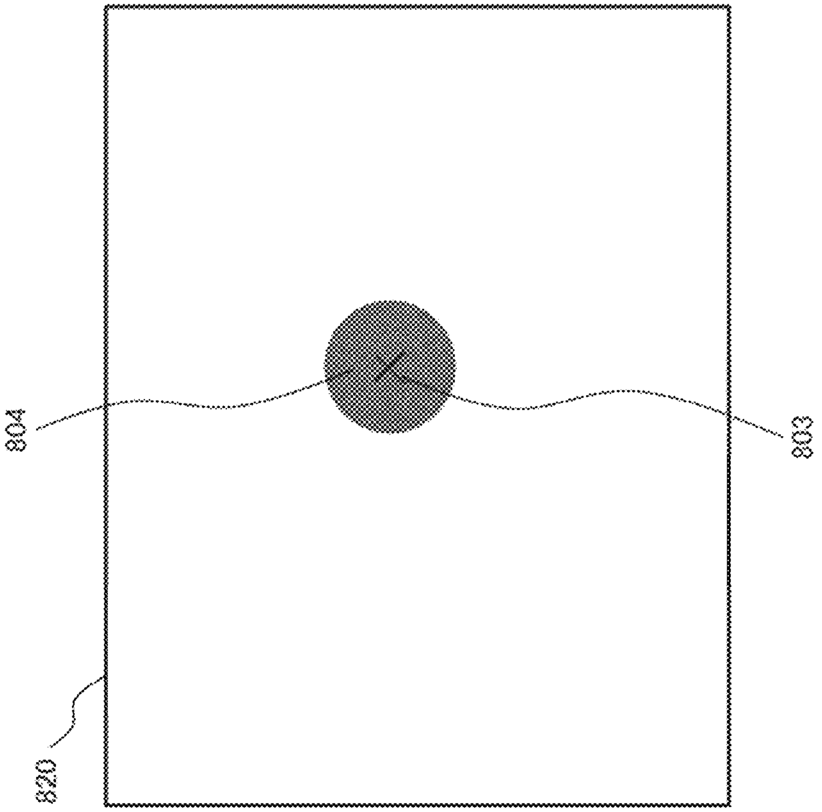

Behavior of the trained deep learning model 610 will be described with reference to FIGS. 8A and 8B. An image 310 in FIG. 8A is the same image as the image 310 in FIG. 3A. An image 820 in FIG. 8B is an inference image (hereinafter, referred to as an inference image 820) in which the blob 804 is formed with position coordinates 803, which are the same as the position coordinates of the x mark 302 desired to be detected in the image 310, as the center of gravity. In a case where the deep learning model 610 is a trained learning model in which a training is successfully executed, when the image 310 is input to the deep learning model 610, the deep learning model 610 outputs the label of the position coordinates for the pixels within the same radius as the circular FIG. 704 centered on the position coordinates 803 that are correct position coordinates and outputs the label of the background for the other pixels. That is, the inference image 820 is output from the deep learning model 610.

The position coordinate calculation unit 620 calculates position coordinates from the inference image 820 inferred by the deep learning model 610. Specifically, the blob having an area which is a specific threshold value or more is obtained from the inference image 820, center-of-gravity coordinates of the obtained blob are obtained, and the center-of-gravity coordinates are output. The well-known method may be used for detecting the blobs and calculating the center-of-gravity coordinates. In addition, selection may be prioritized by using the likelihood of center-of-gravity coordinates or the average value of the likelihood of all the blobs. This likelihood value may be output in association with the corresponding center-of-gravity coordinates.

The reliability calculation unit 630 calculates the reliability from the shape of the blob 804 formed at the center-of-gravity position output by the position coordinate calculation unit 620 from the inference image 820 inferred by the deep learning model 610. As a specific calculation method, a known technique for quantifying the difference in shape, such as a method of quantifying a degree of circularity of the blob, a method of obtaining a correlation value with the blob used as the teacher data, a method of polar-coordinate-converting the blob from the center of gravity and quantifying unevenness at the boundary, and the like, or a combination technique thereof may be used.

Next, behavior of the localization apparatus 600 when the difficulty level of detection of the position coordinates is high will be described with reference to FIGS. 9A and 9B.

Figure 9A:
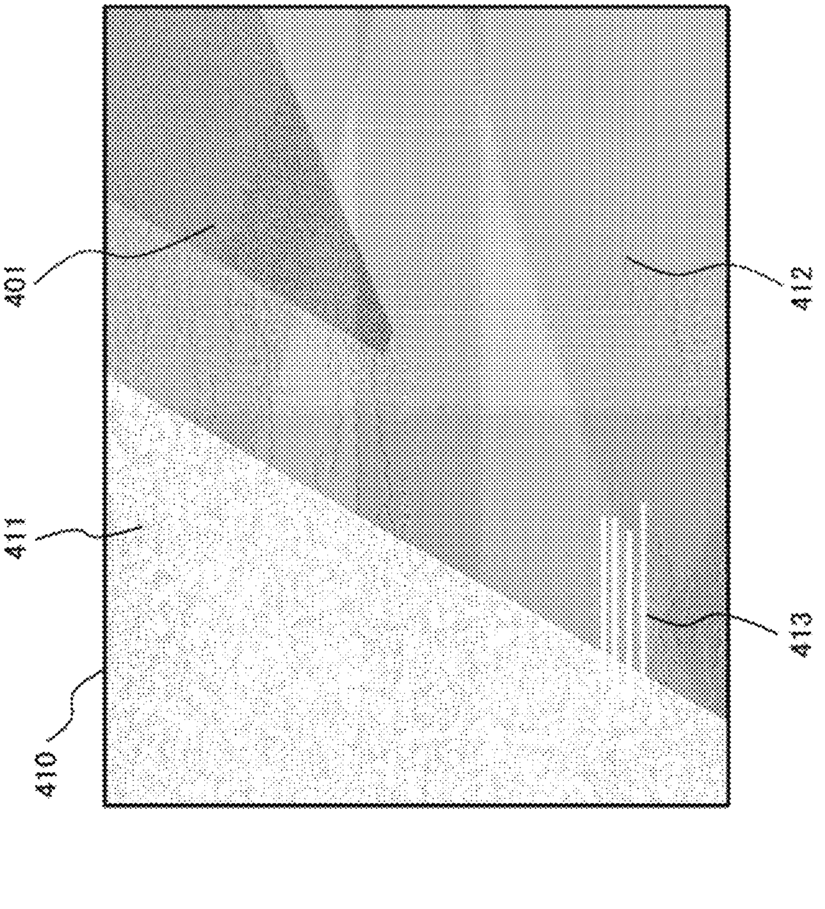
FIGS. 9A and 9B are diagrams illustrating an example of the image data of the inference target and the inference image data as the inference result in the second embodiment.

An image 410 in FIG. 9A is the same image as the image 410 in FIG. 4A.

Figure 9B:
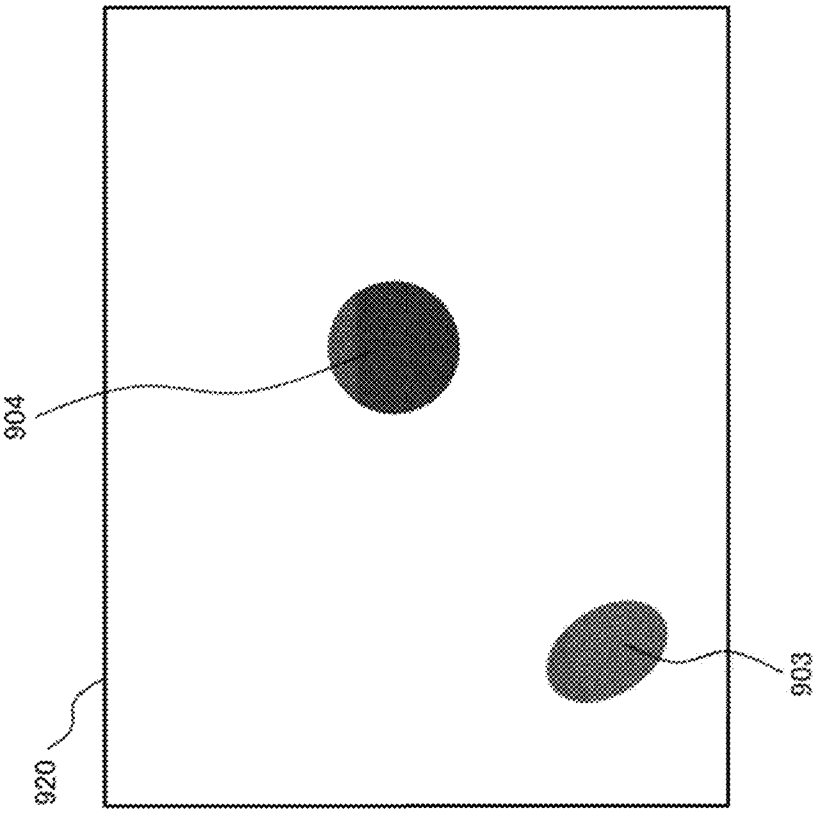

An image 920 in FIG. 9B illustrates an example of the inference image (hereinafter, referred to as an inference image 920) inferred by applying the image 410 to the deep learning model 610. Two blobs of a blob 903 and a blob 904 are formed in the inference image 920. Herein, it is assumed that the blob 903 has a higher likelihood of the center-of-gravity coordinates than the blob 904. In addition, it is also assumed that the blob 903 has a lower degree of circularity than the blob 904.

The position coordinate calculation unit 620 obtains blobs having an area which is a specific threshold value or more from the inferred image 920 inferred by the deep learning model 610, obtains the center-of-gravity coordinates of the obtained blobs, and outputs the center-of-gravity coordinates.

The reliability calculation unit 630 calculates the reliability from the shape of the blob 903 formed at the center-of-gravity position output by the position coordinate calculation unit 620 from the inference image 920. Since the blob 903 has a low degree of circularity, the low reliability is output. Accordingly, it can be seen that the position coordinates output by the position coordinate calculation unit 620 are not appropriate. In the above-described embodiment, only inappropriate position coordinates are output, but the plurality of position coordinates and the corresponding reliability may be output, and appropriate position coordinates may be selected by a post-stage process (not illustrated). In addition, although the configuration of the localization apparatus is changed, the position coordinates having the highest reliability may be output by inputting the output of the reliability calculation unit to the position coordinate calculation unit.

FIG. 10 is a flowchart of a localization program representing one embodiment of the invention by using a computer system (not illustrated) incorporating the localization apparatus 600 described with reference to FIG. 6.

First, the deep learning model is trained by using the plurality of pairs of the training image data and the teacher data (S1001). Examples of the training image data and the teacher data are illustrated in the training image data 210 in FIG. 7A and the teacher data 720 in FIG. 7B, respectively.

Next, the inference image is obtained by inputting the image of which position coordinates are desired to be detected to the trained deep learning model 610 (S1002). The example of the image of which position coordinates are desired to be detected is illustrated as the image 310 in FIG. 8A, and the example of the inference image is illustrated as the inference image 820 in FIG. 8B.

The maximum N of blobs having an area which is a specific threshold value or more are obtained from the obtained inference image, and the center-of-gravity position the blob is obtained (S1003). The specific threshold value and N are set in advance.

Reliability is calculated from the shape of the blob corresponding to the obtained center-of-gravity coordinates (S1004). As a specific calculation method, a known technique for quantifying the difference in shape, such as a method of quantifying a degree of circularity of the blob, a method of obtaining a correlation value with the blob used as the teacher data, a method of polar-coordinate-converting the blob from the center of gravity and quantifying unevenness at the boundary, and the like, or a combination technique thereof may be used.

Finally, the center-of-gravity coordinates having the highest reliability are obtained, and the coordinates are output (31005). At this time, the reliability corresponding to the center-of-gravity coordinates to be output may be output.

In addition, in the above-described example, the teacher data is the circular figure, but the teacher data may be a polygon such as a quadrangle. Even in that case, the feature calculated by a well-known technique for the shape may be used as the reliability.

According to the present embodiment, since the position coordinates are obtained by calculating the center of gravity of the blobs having the same pixel values, the position coordinates can be determined uniquely, so that the position coordinates can be obtained by a relatively simple process in comparison with the method described in the first embodiment.

Modified Example

A modified example of the second embodiment will be described with reference to FIGS. 18 to 20. FIG. 18 is a block diagram illustrating a configuration example of a localization apparatus 1800 according to the present modified example. The localization apparatus 1800 includes a deep learning model 1810 and a position coordinate calculation unit 1820.

The present modified example differs from the second embodiment in that the reliability calculation unit 630 described in the second embodiment is not provided. The deep learning model 1810 is the same as the deep learning model 610 of FIG. 6 described in the second embodiment. Therefore, examples of training image data and teacher data are the same as the training image data 210 and teacher data 720 described with reference to FIGS. 7A and 7B.

Next, behavior of the localization apparatus 1800 when the difficulty level of detection of the position coordinates is high will be described with reference to FIGS. 19A and 19B.

Figure 19A:
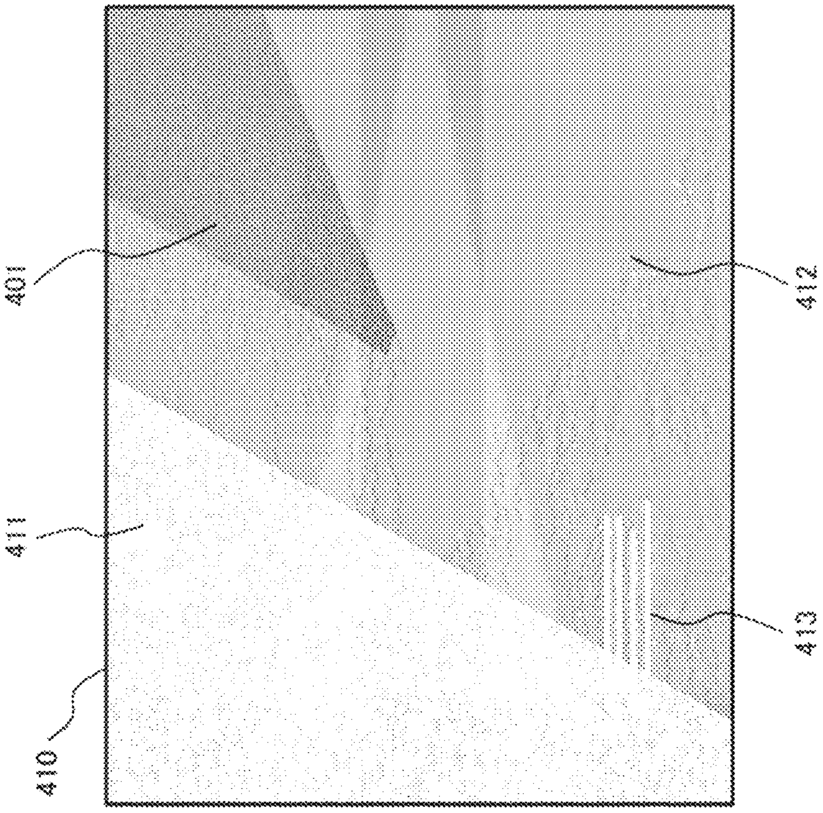
FIGS. 19A and 19B are diagrams illustrating an example of training image data and teacher image data in the modified example of the second embodiment.
Figure 19B:
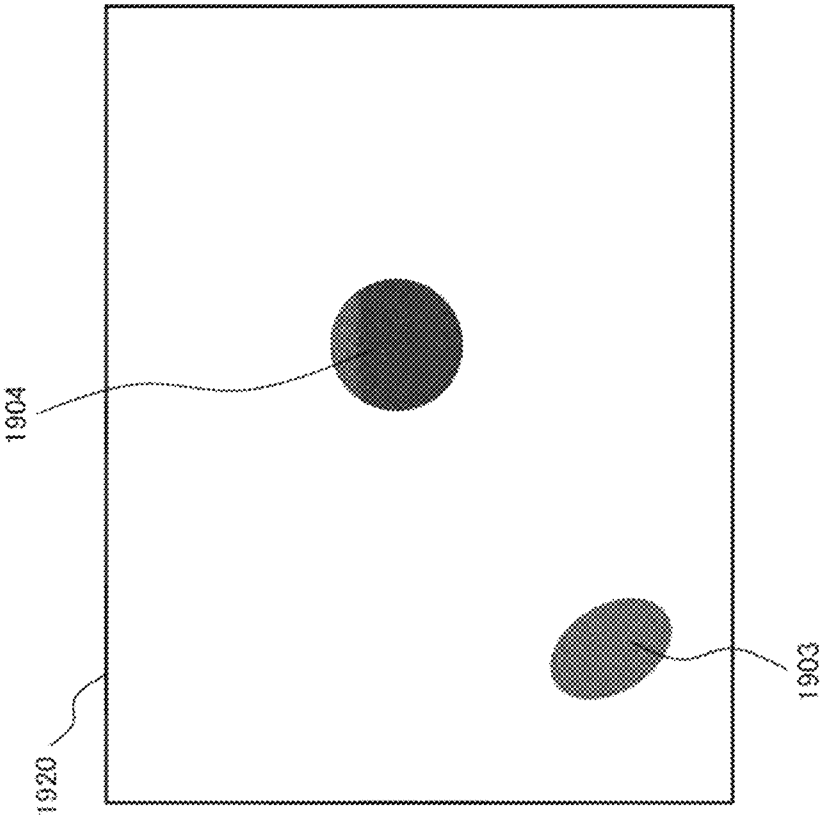

An image 410 in FIG. 19A is the same image as the image 410 in FIG. 4A. An inference image 1920 in FIG. 19B illustrates an example of an inference image inferred by applying the image 410 to the deep learning model 1810. Two blobs of a blob 1903 and a blob 1904 are formed in the inference image 1920. Herein, the blob 1904 is a blob corresponding to position coordinates desired to be detected, and the blob 1903 is a blob corresponding to position coordinates that are not the position coordinates desired to be detected. It is also assumed that the blob 1903 has a smaller area than the blob 1904.

The position coordinate calculation unit 1820 obtains the blob having a largest area from the inference image 1920, obtains the center-of-gravity coordinates of the obtained blob, and outputs the center-of-gravity coordinates. In the present modified example, when the plurality of blobs are detected in the inference image 1920 by using the characteristic that the area of the blob of which center-of-gravity coordinates that are to be originally obtained is generally larger than that of another blob that becomes noise, it is determined as the blob to be originally detected without calculating reliability of each of the plurality of blobs by detecting the blob having the largest area.

FIG. 20 is a flowchart of a localization program for detecting position coordinates according to the present modified example by using a computer system (not illustrated).

First, the deep learning model 1810 is trained by using the plurality of pairs of the training image data and the teacher data (S2001). Examples of the training image data and the teacher data are the same as the training image data 210 and teacher data 720 described with reference to FIGS. 7A and 7B in the second embodiment, respectively.

Next, the inference image is obtained by inputting the image of which position coordinates are desired to be detected to the trained deep learning model (S2002). The example of the image of which position coordinates are desired to be detected is illustrated as the image 410 in FIG. 19A, and the example of the inference image is illustrated as the inference image 1920 in FIG. 19B.

A blob having the largest area is obtained from the obtained inference image, and the center-of-gravity position of the blob is obtained (S2003). Finally, the obtained coordinates are output (S2005).

In an example in the related art, when the peak becomes flat or a plurality of peaks appear in the vicinity, complicated processing is required for detection of the peak. However, in the present modified example, there is an advantage that a simple process of obtaining the center-of-gravity coordinates of the blob is enough.

In addition, the present modified example has an advantage in that the position coordinates can be obtained without obtaining a reliability index.

Third Embodiment

A third embodiment of the invention will be described with reference to FIGS. 11 to 15.

FIG. 11 is a block diagram illustrating a configuration example of a localization apparatus 1100 according to the present embodiment. The localization apparatus 1100 includes a deep learning model 1110, a position coordinate calculation unit 1120, and a reliability calculation unit 1130.

The deep learning model 1110 is a trained learning model in which a pre-training is executed by using a plurality of pairs of training image data and teacher data. The deep learning model 1110 can also perform the semantic segmentation. The deep learning model 1110 randomly performs dropout on internal nodes a plurality of times and determines a label of the pixel by using the average value thereof. In addition, it is assumed that the image in which the pixel values are variations by means of a plurality of dropouts is also output.

In the second embodiment, the plurality of pairs of training image data 210 and teacher data 720 as described with reference to FIGS. 7A and 7B are prepared, and the deep learning model 1110 is trained.

Behavior of the trained deep learning model 1110 will be described with reference to FIGS. 12A and 12B.

Figure 12B:
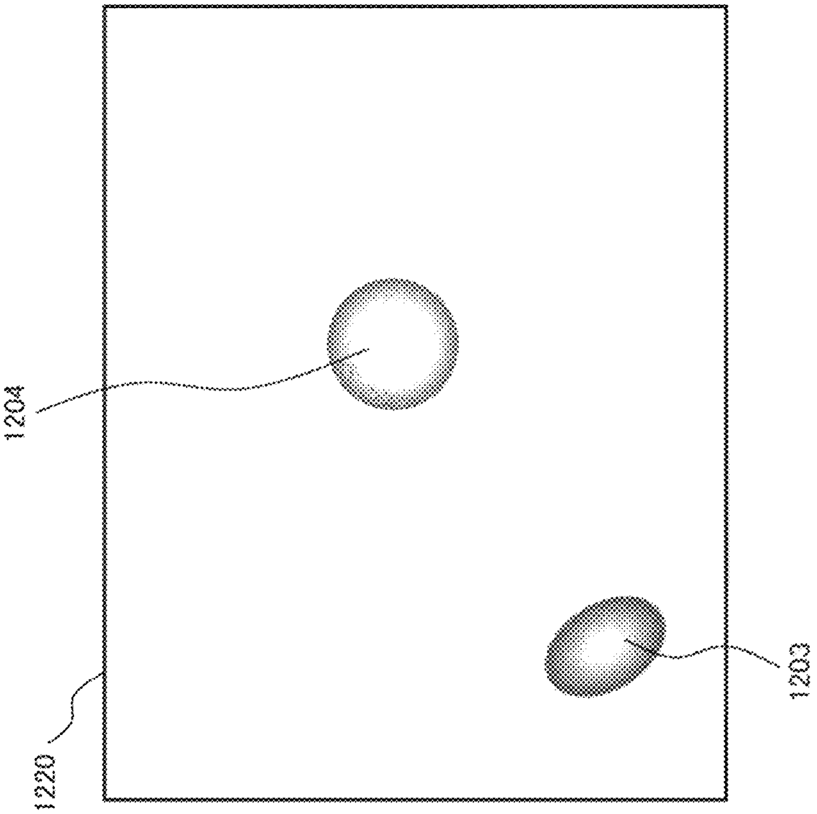
FIGS. 12A and 12B are diagrams illustrating an example of inference image data as an inference result in the third embodiment.
Figure 12A:
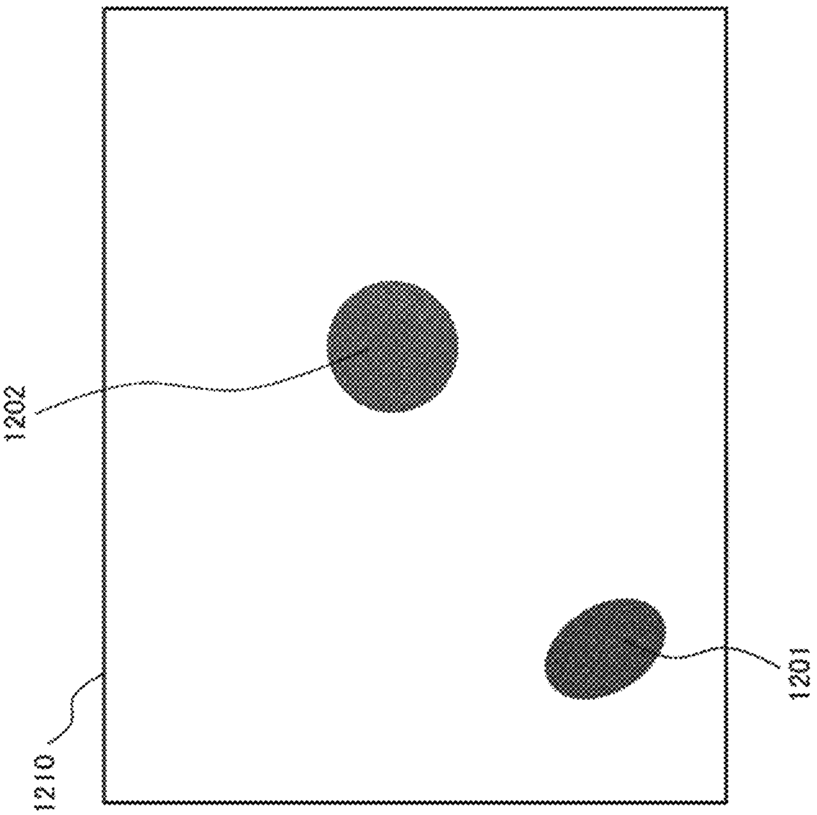

An image 1210 in FIG. 12A illustrates an example of a label image (hereinafter, referred to as an inference image 1210) inferred by using an average value obtained by performing the semantic segmentation by randomly performing dropout a plurality of times when the subject image 410 described with reference to FIG. 9A in the second embodiment is input to the deep learning model 1110. Two blobs of a blob 1201 and a blob 1202 are formed in the inference image 1210. Herein, it is assumed that the blob 1201 has a higher likelihood than the blob 1202.

An image 1220 in FIG. 12B illustrates an example of an image (hereinafter, referred to as an inference image 1220) inferred by using a variation obtained by performing the semantic segmentation by randomly performing dropout a plurality of times when the subject image 410 in FIG. 9A is input to the deep learning model 1110. Each pixel in the inference image 1220 represents a variation (or label variation) of the output value of the deep learning model 1110 with respect to performing dropout a plurality of times. The inference image 1220 denotes that the whiter the image, the smaller the variation; and the darker the image, the larger the variation.

The position coordinate calculation unit 1120 in the localization apparatus 1100 illustrated in FIG. 11 obtains the blob having an area which is a specific threshold value or more from the inference image 1210 in FIG. 12A, obtains center-of-gravity coordinates of the obtained blob, and outputs the center-of-gravity coordinates of the blob.

On the other hand, the reliability calculation unit 1130 in the localization apparatus 1100 calculates the reliability from the shape of the blob 1203 formed at the center-of-gravity position output by the position coordinate calculation unit 1120 from the inference image 1220 in FIG. 12B. Since the blob 1203 has a low degree of circularity, low reliability is output. Accordingly, it can be seen that the position coordinates output by the position coordinate calculation unit 1120 are not appropriate. Instead of the degree of circularity, an amount of variation from a circle of which the variation is zero may be obtained.

In the above-described embodiment, only inappropriate position coordinates are output, but the plurality of position coordinates and the corresponding reliability may be output, and appropriate position coordinates may be selected by a post-stage process (not illustrated). Further, although the configuration of the localization apparatus 1100 is changed, the output of the reliability calculation unit 1130 may be input to the position coordinate calculation unit 1120 to output the position coordinates with highest reliability.

FIG. 13 is a flowchart of a localization program for detecting position coordinates described in the present embodiment by using a computer system (not illustrated).

First, the deep learning model is trained by using the plurality of pairs of the training image data and the teacher data (S1301). This deep learning model performs the semantic segmentation by randomly performing dropout on the internal nodes a plurality of times and determines the label of the pixel by using the average value. In addition, it is assumed that the image in which the pixel values are variations in the semantic segmentation by means of the plurality of dropouts is also output. Examples of the training image data and the teacher data are illustrated as the training image data 210 in FIG. 7A and the teacher data 720 in FIG. 7B, respectively.

Next, the inference image is obtained by inputting the image of which position coordinates are desired to be detected to the trained deep learning model 1110 and determining the pixel label by using an average value obtained by performing the semantic segmentation by randomly performing dropout a plurality of times, and the inference image is obtained in which the pixel values are variations in the semantic segmentation by means of the plurality of dropouts (S1302). The example of the image of which position coordinates are desired to be detected is illustrated as image 410 in FIG. 9A. An example of the inference image in which pixel labels are determined by using the average values obtained by performing the semantic segmentation by randomly performing dropout a plurality of times is illustrated as the inference image 1210 in FIG. 12A, and an example of the inference image in which the pixel values are variations in the semantic segmentation by means of the plurality of dropouts is illustrated as the inference image 1220 in FIG. 12B.

The maximum N of blobs having an area which a specific threshold value or more are obtained from the inference image in which pixel labels are determined by using the average value obtained by performing the semantic segmentation by randomly performing dropout a plurality of times, and the center-of-gravity position of the blob is obtained (S1303). The specific threshold value and N are set in advance.

The blob corresponding to the obtained center-of-gravity coordinates is specified from the inference image of which pixel value is a variation in the semantic segmentation by means of the plurality of dropouts, and the reliability is calculated from the shape of the blob (S1304). As a specific calculation method, a known technique for quantifying the difference in shape, such as a method of quantifying a degree of circularity of the blob, a method of obtaining a correlation value with the blob used as the teacher data, and a method of polar-coordinate-converting the blob from the center of gravity and quantifying unevenness at the boundary, or a combination technique thereof may be used.

Finally, the center-of-gravity coordinates having the maximum reliability are obtained, and the center coordinates are output (31305). At this time, the reliability corresponding to the center-of-gravity coordinates to be output may be output.

In addition, in the above-described example, the teacher data is a circular figure, but the teacher data may be a polygon such as a quadrangle. Even in that case, features calculated by a well-known technique for a shape may be used as the reliability.

According to the present embodiment, since the center-of-gravity coordinates and the reliability are obtained by using the average value and variation in the semantic segmentation by means of the plurality of dropouts, the robustness against noise becomes stronger (higher), and the position coordinates can be obtained with higher reliability.

Fourth Embodiment

Next, an example in which the localization apparatus 100, 600, 1100, or 1800 described in the first to third embodiments is applied to the actual apparatus will be described.

FIG. 14 is a block diagram illustrating a configuration example of a sample machining apparatus 1400 according to a fourth embodiment. The sample machining apparatus 1400 includes a needle unit 1401, a conveying unit 1402, a computer 1403, and the image sensor 1404. The needle unit 1401, the conveying unit 1402, the computer 1403, and the image sensor 1404 are connected via a bus 1406. The bus 1406 holds or mediates transmission of data, control information and analysis information handled by each processing unit connected to the bus 1406.

The sample machining apparatus 1400 is connected to a display apparatus 1410 and an input/output apparatus 1411 via the bus 1406. The sample machining apparatus 1400 may be wired or wirelessly connected to the display apparatus 1410 and the input/output apparatus 1411. It is noted that, although the display apparatus 1410 and the input/output apparatus 1411 are provided outside the sample machining apparatus 1400 in FIG. 14, the display apparatus 1410 and the input/output apparatus 1411 may be embedded in the sample machining apparatus 1400.

In order to pick up a portion of a specific sample, the sample machining apparatus 1400 has a function of conveying the specific sample into the apparatus and allowing the tip of the needle (not illustrated) embedded in the needle unit 1401 to approach a specific location of the sample.

A processing flow for allowing the tip of the needle (not illustrated) embedded in the needle unit 1401 to approach the specific location of the sample will be described with reference to FIG. 15.

First, a target sample (not illustrated) is conveyed into the sample machining apparatus 1400 by using the conveying unit 1402 (S1501). Next, a machining unit (not illustrated) performs machining on the specific location of the conveyed sample (S1502). The specific location of the machined sample is detected by using a localization program generated in advance in the computer 1403 and the image of the sample imaged by the image sensor 1404 (S1503). This localization program may be a localization program corresponding to the flowchart illustrated in FIG. 13 which is trained to detect the specific location of the sample or may be based on a well-known technique.

In a case where the localization program corresponding to the flowchart illustrated in FIG. 13 is used, when the reliability calculated in the step corresponding to S1304 is lower than a predetermined threshold value, an operator may be notified by the alarm. In addition, when the position coordinates calculated by using another localization program stored in the computer 1403 are compared and both exist within the allowable range, the operation may be continued. When the operator is notified by the alarm, the operator may refer to the image of the image sensor 1404 displayed on the display apparatus 1610 and the position coordinates of the center-of-gravity obtained in S1303 of the flowchart illustrated in FIG. 13, so that the operation may be determined to be continued or interrupted.

When continuing the operation, the tip of the needle is detected by using the localization program prepared in advance in the computer 1403 and the image of the needle imaged by the image sensor 1404 (S1504). As this localization program, the localization program corresponding to the flowchart illustrated in FIG. 13 is used.

Herein, when the calculated reliability is lower than a predetermined threshold value, the operator may be notified by the alarm. In addition, when the position coordinates calculated by using another localization program are compared and both exist within the allowable range, the operation may be continued. When the operator is notified by the alarm, the operator may refer to the image of the image sensor displayed on the display apparatus and the position coordinates, so that the operation may be determined to be continued or interrupted. When continuing the operation, the needle is moved by controlling the needle unit 1401 so that the position coordinates of the detected specific location of the sample and the position coordinates of the tip of the needle are allowed to approach each other (S1505).

According to the present embodiment, since the center-of-gravity coordinates and the reliability are obtained by the same method as described in the third embodiment, the robustness against noise becomes stronger, and the tip position of the needle can be obtained with higher reliability.

Fifth Embodiment

Next, another example in which the localization apparatus 100, 600, 1100, or 1800 described in the first to third embodiments is applied to an actual apparatus will be described.

FIG. 16 is a block diagram illustrating a configuration example of a sample inspection apparatus 1600 according to a fifth embodiment. The sample inspection apparatus 1600 includes a charged particle beam unit 1601, a conveying unit 1602, a computer 1603, and an image sensor 1604. The charged particle beam unit 1601, the conveying unit 1602, the computer 1603, and the image sensor 1604 are connected via a bus 1606. The bus 1606 holds or mediates transmission of data, control information, and analysis information handled by each processing unit connected to bus 1606.

The sample inspection apparatus 1600 is connected to a display apparatus 1610 and an input/output apparatus 1611 via the bus 1606. The sample inspection apparatus 1600 may be wired or wirelessly connected to the display apparatus 1610 and the input/output apparatus 1611. It is noted that, although the display apparatus 1610 and the input/output apparatus 1611 are provided outside the sample inspection apparatus 1600 in FIG. 16, the display apparatus 1610 and the input/output apparatus 1611 may be embedded in the sample inspection apparatus 1600.

A processing flow for detecting a specific location of a sample will be described with reference to FIG. 17.

First, a target sample (not illustrated) is conveyed into the sample inspection apparatus 1600 by using the conveying unit 1602 (S1701). Next, the specific location of the sample is detected by using the localization program stored in advance in the computer 1603 and the image of the sample imaged by the image sensor 1604 or the charged particle beam unit 1601 (S1702). This localization program is a localization program corresponding to the flowchart described in the third embodiment with reference to FIG. 13 which is trained to detect the specific location of the sample.

Herein, when the calculated reliability is lower than a predetermined threshold value, an operator may be notified by the alarm. In addition, when the position coordinates calculated by using another localization program stored in the computer 1603 are compared and both exist within the allowable range, the operation may be continued. When the operator is notified by the alarm, the operator refers to the image detected by the image sensor 1604 displayed on the display apparatus 1610 and the position coordinates of the center-of-gravity obtained in S1303 of the flowchart illustrated in FIG. 13, so that the operation may be determined to be continued or interrupted. When continuing the operation, inspection of the detected specific location of the sample is performed (S1703).

According to the present embodiment, since the center-of-gravity coordinates and the reliability are obtained by the same method as described in the third embodiment, the robustness against noise becomes stronger, and the specific location of the sample can be obtained with higher reliability.

REFERENCE SIGNS LIST

100, 600, 1100, 1800: localization apparatus
110, 610, 1110, 1810: deep learning model
120, 620, 1120, 1820: position coordinate calculation unit
130, 630, 1130: reliability calculation unit
201: subject image
210: training image data
220, 720: teacher data
320, 420, 820, 920, 1210: inference images
1210: inference image
1400: sample machining apparatus
1600: sample inspection apparatus

The invention claimed is:

1. A localization apparatus comprising:

a deep learning model for semantic segmentation trained by using a plurality of combinations of training image data in which position coordinates desired to be detected on an image obtained by imaging a subject is specified and teacher image data in which a pixel group representing a circular or polygonal shape centered on the position coordinates desired to be detected, which is configured with the same pixel value, is formed, on a uniformly labeled image as a background, at a position relative to the subject at the position coordinates desired to be detected on the combined training image data;

a position coordinate calculation unit calculating position coordinates desired to be obtained in an image of a new subject by using inference image data obtained by inputting the image of the new subject of which the position coordinates are desired to be obtained to the deep learning model, the position coordinate calculation unit including a process of obtaining a connected component of the inference image data and a center of gravity of the connected component; and a reliability calculation unit configured to calculate reliability of the position coordinates calculated by the position coordinate calculation unit that is not a peak value by using information of a pixel group of the inference image data output from the deep learning model, wherein the localization apparatus selects position coordinates by referring to the calculated reliability.

2. A localization method comprising:

training a deep learning model for semantic segmentation by using a plurality of combinations of training image data in which position coordinates desired to be detected on an image obtained by imaging a subject is specified and teacher image data in which a pixel group representing a circular or polygonal shape centered on the position coordinates desired to be detected, which is configured with the same pixel value, is formed on a uniformly labeled image as a background, at a position relative to the subject at the position coordinates desired to be detected on the combined training image data;

calculating position coordinates desired to be obtained in an image of a new subject by using inference image data obtained by inputting the image of the new subject of which the position coordinates are desired to be obtained to the deep learning model by a position coordinate calculation unit including a process of obtaining a connected component of the inference image data and a center of gravity of the connected component; and calculating, in a reliability calculation unit, a reliability of the position coordinates calculated by the position coordinate calculation unit that is not a peak value, by using information of a pixel group of the inference image data output from the deep learning model; and selecting position coordinates by referring to the calculated reliability.

3. The localization apparatus according to claim 1, wherein the reliability calculation unit calculates reliability of the position coordinates calculated by the position coordinate calculation unit by using information about the pixel group of the inference image data output from the deep learning model.

4. The localization apparatus according to claim 1, wherein the reliability calculation unit includes a process of quantifying global information of the pixel group of the inference image data.

5. A sample machining apparatus comprising the localization apparatus according to claim 1.

6. A sample inspection apparatus comprising the localization apparatus according to claim 1.

7. The localization method according to claim 2, wherein a pixel group different from background of the subject with respect to the subject at the position desired to be detected in the teacher image data is a circle or a polygon centered on the position coordinates desired to be detected, which is configured with the same pixel value, the deep learning model is a deep learning network for semantic segmentation, and the position coordinate calculation unit includes a process of obtaining a connected component of the inference image data and a center of gravity of the connected component.

8. The localization apparatus according to claim 1, wherein the reliability calculation unit includes a process of quantifying a difference between global information of the pixel group of the inference image data and a shape of the pixel group of the teacher image data.

9. The localization apparatus according to claim 1, wherein the reliability calculation unit includes a process of quantifying a shape of the pixel group of the inference image data.

10. A sample machining method comprising the localization method according to claim 2.

11. A sample inspection method comprising the localization method according to claim 2.

12. A localization apparatus comprising:

a deep learning model for semantic segmentation trained by using a plurality of combinations of training image data in which position coordinates desired to be detected on an image obtained by imaging a subject is specified and teacher image data in which a pixel group representing a circular or polygonal shape centered on the position coordinates desired to be detected, which is configured with the same pixel value, is formed, on a uniformly labeled image as a background, at a position relative to the subject at the position coordinates desired to be detected on the combined training image data;

a position coordinate calculation unit calculating position coordinates desired to be obtained in an image of a new subject by using inference image data obtained by inputting the image of the new subject of which the position coordinates are desired to be obtained to the deep learning model, the position coordinate calculation unit including a process of obtaining a connected component of the inference image data and a center of gravity of the connected component; and a reliability calculation unit calculating reliability of the position coordinates calculated by the position coordinate calculation unit by using information about the pixel group of the inference image data output from the deep learning model, wherein the reliability calculation unit includes a process of quantifying global information of the pixel group of the inference image data.

13. The localization apparatus according to claim 1, wherein the reliability that is not a peak value is a circularity of a blob.

14. The localization apparatus according to claim 1, wherein the reliability that is not a peak value is a correlation value with a blob used in the teacher data.

15. The localization apparatus according to claim 1, wherein the reliability that is not a peak value is obtained by converting a blob into polar coordinates from its center of gravity and quantifying irregularities of a boundary portion.

16. The localization method according to claim 2, wherein the reliability that is not a peak value is a circularity of a blob.

17. The localization method according to claim 2, wherein the reliability that is not a peak value is a correlation value with a blob used in the teacher data.

18. The localization method according to claim 2, wherein the reliability that is not a peak value is obtained by converting a blob into polar coordinates from its center of gravity and quantifying irregularities of a boundary portion.

* * * * *